United States Patent [19]

Hara

[11] Patent Number: 5,519,544
[45] Date of Patent: May 21, 1996

[54] MAGNETIC RECORDING/REPRODUCING APPARATUS WITH DUAL PURPOSE HEADS

[75] Inventor: Mitsuhiko Hara, Yokohama, Japan

[73] Assignee: Victor Company of Japan, Ltd., Yokohama, Japan

[21] Appl. No.: 137,615

[22] Filed: Oct. 15, 1993

[30] Foreign Application Priority Data

Oct. 16, 1992 [JP] Japan .................................. 4-304548
Mar. 8, 1993 [JP] Japan .................................. 5-73067

[51] Int. Cl.$^6$ ............................. G11B 5/02; G11B 15/14
[52] U.S. Cl. ............................. 360/22; 360/33.1; 360/64
[58] Field of Search .................................. 360/10.1, 10.3, 360/19.1, 33.1, 64, 22

[56] References Cited

U.S. PATENT DOCUMENTS

| | | | |
|---|---|---|---|
| 4,484,236 | 11/1984 | Wilkinson | 360/10.3 |
| 5,051,846 | 9/1991 | Tsushima et al. | 360/19.1 |
| 5,063,452 | 11/1991 | Higurashi | 360/19.1 |
| 5,341,248 | 8/1994 | Amada et al. | 360/64 X |
| 5,359,471 | 10/1994 | Hasegawa | 360/64 |

FOREIGN PATENT DOCUMENTS

| | | |
|---|---|---|
| 0227210 | 7/1987 | European Pat. Off. . |
| 59-104703 | 6/1984 | Japan . |
| 1302518 | 12/1989 | Japan . |
| 2-276003 | 11/1990 | Japan . |
| 3-072793 | 3/1991 | Japan . |
| 3-117285 | 5/1991 | Japan . |
| 3-127313 | 5/1991 | Japan . |
| 3-201687 | 9/1991 | Japan . |
| 4-170701 | 6/1992 | Japan . |

*Primary Examiner*—Andrew L. Sniezek
*Attorney, Agent, or Firm*—Michael N. Meller

[57] ABSTRACT

A magnetic recording/reproducing apparatus for expanding the functions of the VTR with a limited number of heads. The apparatus includes audio heads A1 and A2 having azimuth angles of ±30 degrees respectively, video heads SP1 and SP2 having azimuth angles of ±6 degrees, video heads WP1 and WP2, and video heads WQ1 and WQ2. The audio heads A1 and A2 are used commonly in the standard play mode of the VHS, in the extended play mode and in the wide mode.

8 Claims, 17 Drawing Sheets

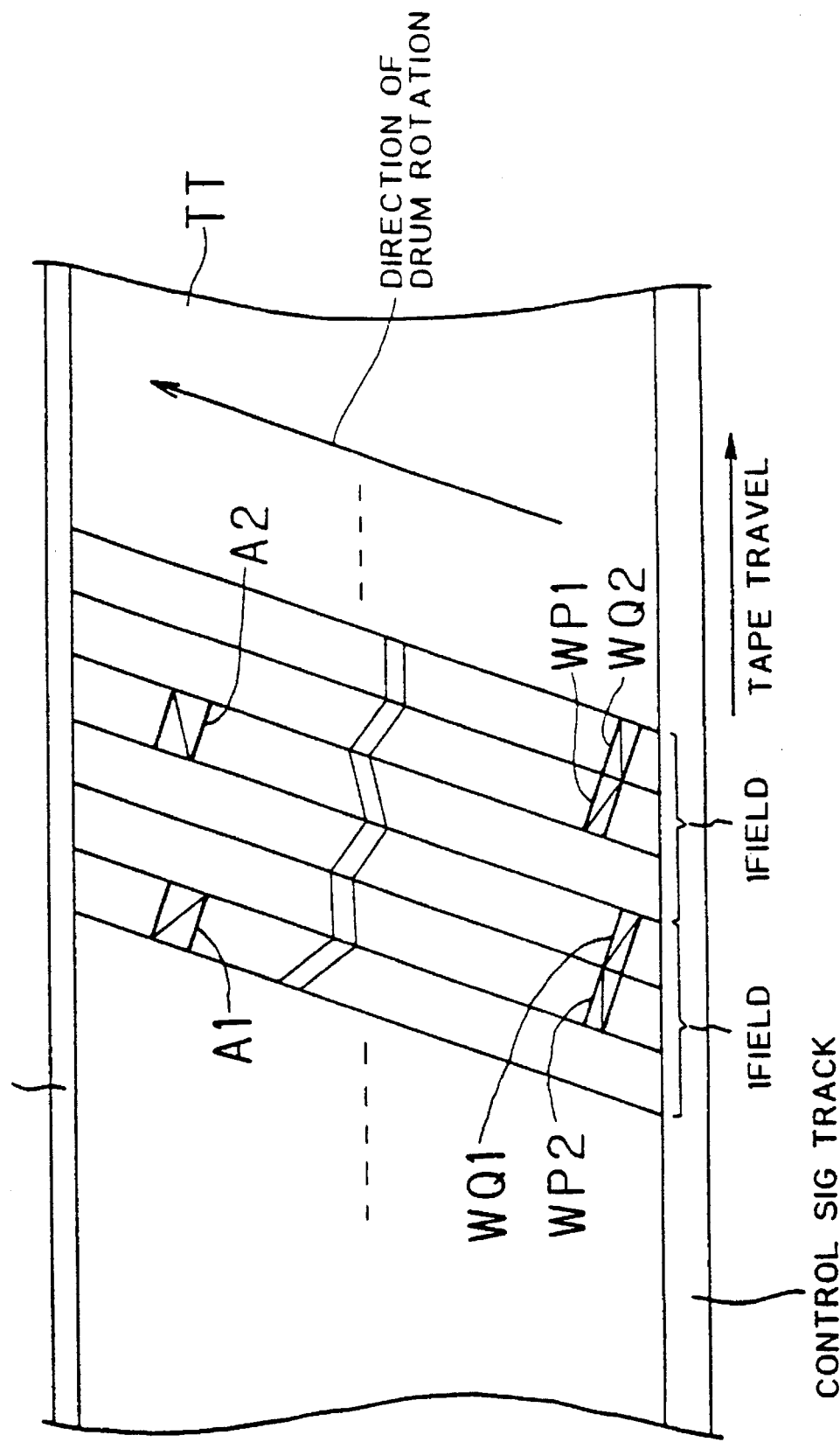

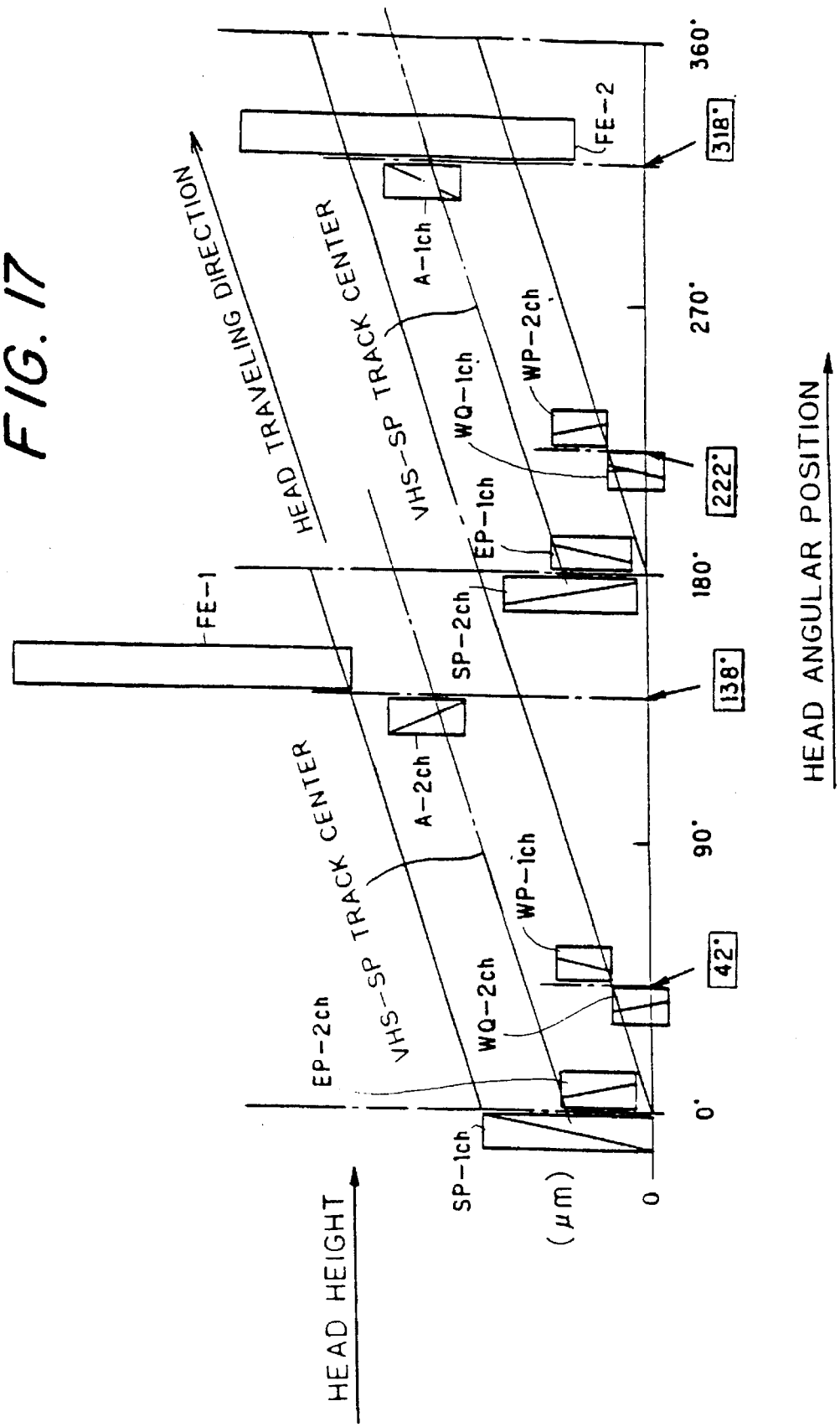

MAGNETIC RECORDING/REPRODUCING APPARATUS WITH DUAL PURPOSE HEADS

BACKGROUND OF THE INVENTION

1. Field of the Invention

The present invention relates to a magnetic tape recording/reproducing apparatus.

2. Description of the Prior Art

As a helical scanning magnetic recording/reproducing apparatus (as will be shortly referred to as the "VTR") using a magnetic tape having a width if a half inch, there is generally known in the prior art the VHS system (one of the industry standard formats) or the S-VHS system (another industry standard format), which uses a rotary drum D, as shown in FIG. 1.

In these VTR systems, video heads SP1 and SP2 having different azimuth angles of ±6 degrees each ether for standard (tape speed) recording and playback abbreviated "SP" mode, video heads EP1 and EP2 having different azimuth angles of ±6 degrees each ether for extended recording and playback (typically ⅓ of the standard tape speed standardized in the VHS system for obtaining an extended recording and playback time for a given length of tape, often abbreviated "EP" mode), an, audio heads A1 and A2 having different azimuth angles of ±30 degrees are arranged at spacings of predetermined angles around the rotary drum D. Moreover, the audio signals inputted to the VTR have their frequencies modulated to produce recording audio signals, which are sequentially recorded in the deeper portion of the magnetic layer of a magnetic tape T by the actions of the audio heads A1 and A2 while preceding the video heads EP1 and EP2 or SP1 and SP2 in the operations. Of the luminance signals and chroma signals separated from video signals inputted to the VTR, on the other hand, the former luminance signals are subjected to an FM modulation to produce the modulated luminance signals, and the latter chroma signals have their frequencies converted down to produce the down-converted (frequency) chroma signals. Both of the modulated luminance signals and the down-converted chroma signals have their frequencies multiplexed to produce the recording video signals. These video signals are recorded in the upper portion over the deeper portion of the magnetic layer of the magnetic tape T by the actions of the video heads EP1 and EP2 or SP1 and SP2 while being superposed over the audio signals by the aforementioned audio heads A1 and A2.

According to the standard (i.e., one of the industry standards) of the VHS system, the audio heads A1 and A2, the video heads EP1 and EP2 and the video heads SP1 and SP2 should satisfy at least the following conditions:

(1) The recording time difference between the video signals and the audio signals to be recorded in the same portion on the same track should be such that the audio signals are recorded in the standard play mode while preceding the video signals by 0 to 2 fields, and those magnetic heads have their azimuth angles in the opposite directions;

(2) The recording time difference between the video signals and the audio signals to be recorded in the same portion on the same track should be such that the audio signals are recorded in the extended play mode while preceding the video signals by 4/3 to 10/3 fields, and those magnetic heads have their azimuth angles in the same directions;

(3) In the standard play mode, the relation between the video track and the audio track to be recorded in the same portion of the same track should be such that the distance to the upper or lower end of the audio track is no less than 10 μm and no more than 29 μm with respect to the video track center; and (4) In the extended play mode, the relation between the video track and the audio track to be recorded in the same portion of the same track should be such that the audio track width is no less than 16 μm and no more than 19.3 μm from the upper end of the video track.

In the VTR of the VHS system satisfying those conditions (1) to (4), the video signals and the audio signals are commonly recorded/reproduced in one track. In order to after-record the audio signals and to enhance the quality of the video signals, a magnetic recording/reproducing method for recording/reproducing the three tracks as one set, is proposed in Japanese Patent Laid-Open No. 47292/1987 by the same applicant.

The aforementioned VTR capable of recording/reproducing the VHS system of the prior art and a set of three tracks has to be equipped with, in addition to the intrinsic three sets of magnetic heads for the VHS system of the prior art, other three sets of magnetic heads for recording/reproducing the three tracks as one set.

According to the prior art, however, it is difficult space-wise and undesirable for the complicated structure to arrange all those magnetic heads over the rotary drum.

SUMMARY OF THE INVENTION

It is, therefore, an object of the present invention to solve the above-specified problems by enabling the audio heads of the VHS system to act as newly required magnetic heads commonly.

In order to achieve this object, according to a first aspect of the present invention, there is provided a magnetic recording/reproducing apparatus comprising: first and second common audio heads arranged on a rotary drum at opposed angular positions and at the same vertical position and have different azimuth angles of ±30 degrees; third and fourth video heads arranged on the rotary drum at opposed angular positions and at the same vertical position, while succeeding the first and second common audio heads, and having different azimuth angles of ±6 degrees; fifth and sixth video heads arranged on the rotary drum at opposed angular positions and at the same vertical position, while succeeding the first and second common audio heads, and having azimuth angles different from those of the first and second common audio heads and third and fourth video heads; and seventh and eighth video heads arranged on the rotary drum at opposed angular positions and at the same vertical position, while succeeding the first and second common audio heads, and having azimuth angles different from those of the first and second common audio heads and the third and fourth video heads, the seventh and eighth video heads being arranged below and close to the fifth and sixth video heads, wherein, in a standard play mode of the VHS system, preceding audio tracks are formed in a deeper portion of the magnetic layer of a magnetic tape by the actions of the first and second audio heads, and succeeding video tracks are then formed in the surface portion of the deeper portion by the actions of the third and fourth video heads, whereas, in a wide mode, the audio tracks having a width of about one third of the track pitch of the succeeding audio tracks are formed by the actions of the first and second common audio heads at the tape running velocity and at substantially the same rotary drum rotating velocity for establishing substantially the same track pitch and track angle as those of the standard play mode of the VHS system, and first and second video tracks having individual widths of about one third of the track pitch of the succeeding video tracks are formed by the actions of the fifth and sixth video heads and the seventh and eighth video heads.

According to a second aspect of the present invention, there is provided a magnetic recording/reproducing apparatus comprising: first and second common audio heads arranged on a rotary drum at opposed angular positions and at the same vertical position and have different azimuth angles of ±30 degrees; third and fourth video heads arranged on the rotary drum at opposed angular positions and at the same vertical position, while succeeding the first and second common audio heads, and having different azimuth angles of ±6 degrees; fifth and sixth video heads arranged on the rotary drum at opposed angular positions and at the same vertical position, while succeeding the first and second common audio heads, and having azimuth angles different from those of the first and second common audio heads and the third and fourth video heads; and seventh and eighth video heads arranged on the rotary drum at opposed angular positions and at the same vertical position, while succeeding the first and second common audio heads, and having azimuth angles different from those of the first and second common audio heads and the third and fourth video heads, the seventh and eighth video heads being arranged over and at a spacing of about one third of the track pitch of the succeeding video tracks from the fifth and sixth video heads, wherein, in a standard play mode of the VHS system, preceding audio tracks are formed in a deeper portion of the magnetic layer of a magnetic tape by the actions of the first and second audio heads, and succeeding video tracks are then formed in the surface portion of the deeper portion by the actions of the third and fourth video heads, whereas, in a wide mode, the audio tracks having a width of about one third of the track pitch of the succeeding audio tracks are formed by the actions of the first and second common audio heads at the tape running velocity and at substantially the same rotary drum rotating velocity for establishing substantially the same track pitch and track angle as those of the standard play mode of the VHS system, and first and second video tracks having individual width of about one third of the track pitch of the succeeding video tracks are formed by the actions of the fifth and sixth video heads and the seventh and eighth video heads.

According to a third aspect of the present invention, there is provided a magnetic recording/reproducing apparatus comprising: first and second common audio heads arranged on a rotary drum at opposed angular positions and at the same vertical position and have different azimuth angles of ±30 degrees; third and fourth video heads arranged on the rotary drum at opposed angular positions and at the same vertical position, while succeeding the first and second common audio heads, and having different azimuth angles of ±6 degrees; fifth and sixth video heads arranged on the rotary drum at opposed angular positions and at the same vertical position, while succeeding the first and second common audio heads, and having azimuth angles different from those of the first and second common audio heads and the third and fourth video heads; and seventh and eighth video heads arranged on the rotary drum at opposed angular positions and at the same vertical position, while succeeding the first and second common audio heads, and having azimuth angles different from those of the first and second common audio heads and the third and fourth video heads, the seventh and eighth video heads being arranged below and close to the fifth and sixth video heads, wherein, in a standard play mode of the VHS system, preceding audio tracks are formed in a deeper portion of the magnetic layer of a magnetic tape by the actions of the first and second audio heads, and succeeding video tracks are then formed in the surface portion of the deeper portion by the action of the third and fourth video heads, wherein, in a wide mode, the audio tracks having a width of about one third of the track pitch of the succeeding audio tracks are formed by the actions of the first and second common audio heads at the tape running velocity and at substantially the same rotary drum rotating velocity for establishing substantially the same track pitch and track angle as those of the standard play mode of the VHS system, and first and second video tracks having individual widths of about one third of the tracks pitch of the succeeding video tracks are formed by the actions of the fifth and sixth video heads and the seventh and eighth video heads, and wherein, in an extended play wide mode, the extended play audio tracks having a width of about one third of the track pitch of the succeeding audio tracks are formed by the actions of the first and second common audio heads at the tape running velocity and at substantially the same rotary drum rotating velocity for establishing substantially the same track pitch and track angle as those of the extended play mode of the VHS system, and the third and fourth video tracks having widths of about one third of the track pitch of the succeeding video tracks are formed by the actions of the fifth and sixth video heads or the seventh and eighth video heads.

According to a fourth aspect of the present invention, there is provided a magnetic recording/reproducing apparatus comprising: first and second common audio heads arranged on a rotary drum at opposed angular positions and at the same vertical position and have different azimuth angles of ±30 degrees; third and fourth video heads arranged on the rotary drum at opposed angular positions and at the same vertical position, while succeeding the first and second common audio heads, and having different azimuth angles of ±6 degrees; fifth and sixth video heads arranged on the rotary drum at opposed angular positions and at the same vertical position, while succeeding the first and second common audio heads, and having azimuth angles different from those of the first and second common audio heads and the third and fourth video heads; and seventh and eighth video heads arranged on the rotary drum at opposed angular positions and at the same vertical position, while succeeding the first and second common audio heads, and having azimuth angles different from those of the first and second common audio heads and the third and fourth video heads, the seventh and eighth video heads being arranged over and at a spacing of about one third of the track pitch of the succeeding video tracks from the fifth and sixth video heads, wherein, in a standard play mode of the VHS system, preceding audio tracks are formed in a deeper portion of the magnetic layer of a magnetic tape by the actions of the first and second audio heads, and succeeding video tracks are then formed in the surface portion of the deeper portion by the actions of the third and fourth video heads, wherein, in a wide mode, the audio tracks having a width of about one third of the track pitch of the succeeding audio tracks are formed by the actions of the first and second common audio heads at the tape running velocity and at substantially the same rotary drum rotating velocity for establishing substantially the same track pitch and track angle as those of the standard play mode of the VHS system, and first and second video tracks having individual widths of about one third of the track pitch of the succeeding video tracks are formed by the actions of the fifth and sixth video heads and the seventh and eighth video heads, and wherein, in an extended play wide mode, the extended play audio tracks having a width of about one third of the track pitch of the succeeding audio tracks are formed by the actions of the first and second common audio heads at the tape running velocity and at substantially the same rotary drum rotating velocity for establishing substantially the same track pitch and track angle as those of the extended play mode of the VHS system, and third and fourth video tracks having widths of about one third of the track pitch of the succeeding video tracks are formed by the actions of the fifth and sixth video heads or the seventh and eighth video heads.

BRIEF DESCRIPTION OF THE DRAWINGS

FIG. 3 is a diagram for explaining a tape pattern in a wide mode in a first embodiment;

FIG. 17 is a conceptual diagram corresponding to FIG. 15(B) for explaining the angular position and vertical position on which the heads are mounted.

DETAILED DESCRIPTION OF THE PREFERRED EMBODIMENTS

Figure 1:
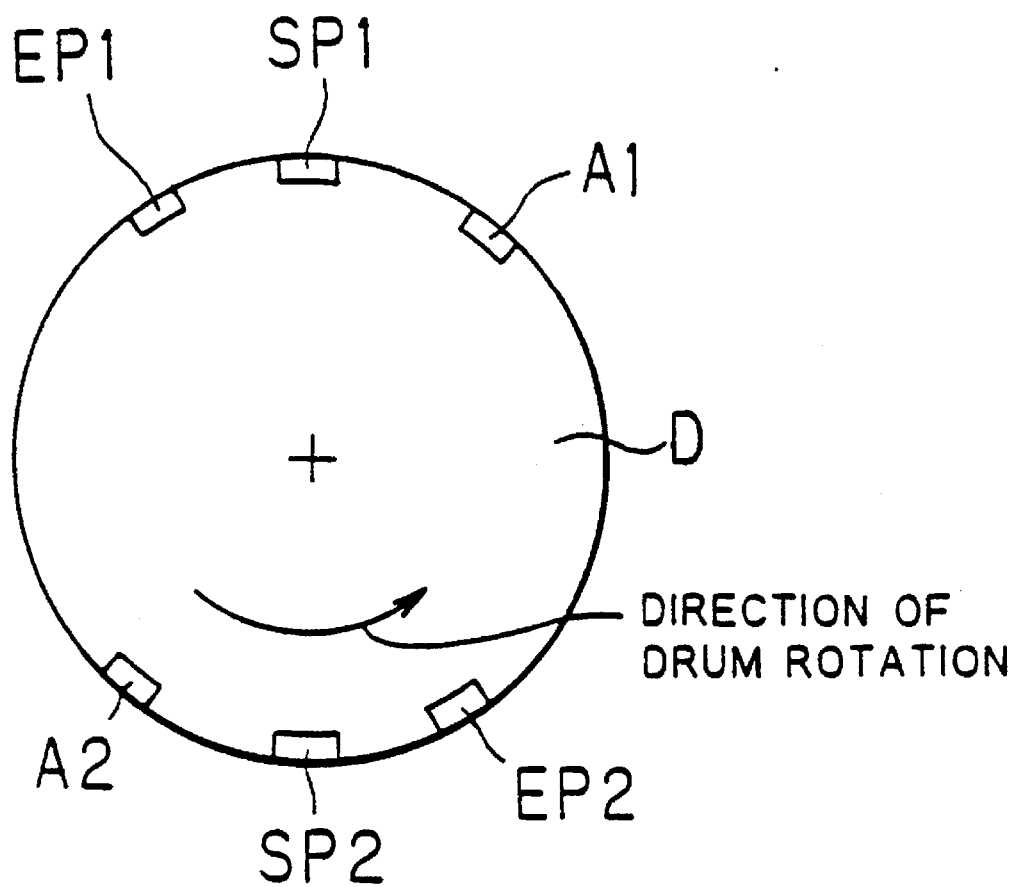
FIG. 1 is a top plan view for explaining a head arrangement over a rotary drum of the prior art.

Magnetic recording/reproducing apparatus according to the present invention will be described in detail with reference to the accompanying drawings, where same reference numerals, symbols and abbreviations are used to denote like or equivalent elements including those used in the aforementioned prior arts, and detailed explanation of such elements are omitted for simplicity.

The present invention will be described in the following in connection with its embodiments with reference to the accompanying drawings.

The VTR according to the present embodiment produces tape patterns (i.e., track patterns on the tape) for a set of three tracks at substantially equal tape running velocities and substantially equal tape rotary drum velocities, which are used to establish substantially the same track pitches and angles as those in the standard play mode of the VHS system. Moreover, these track widths for a set of three tracks are set substantially equal to about one third, e.g., about 19 μm of the track pitch (58 μm) in the standard play mode (in which the recording/reproducing operations are carried out by video heads SP1 and SP2). Moreover, the tape is formed with one audio-exclusive track for after-recording the audio data and two video tracks for recording two programs, and these three tracks are used for the recording/reproducing operations. This mode will be called the "wide mode" or simply "the modified-play mode".

Figure 2A:
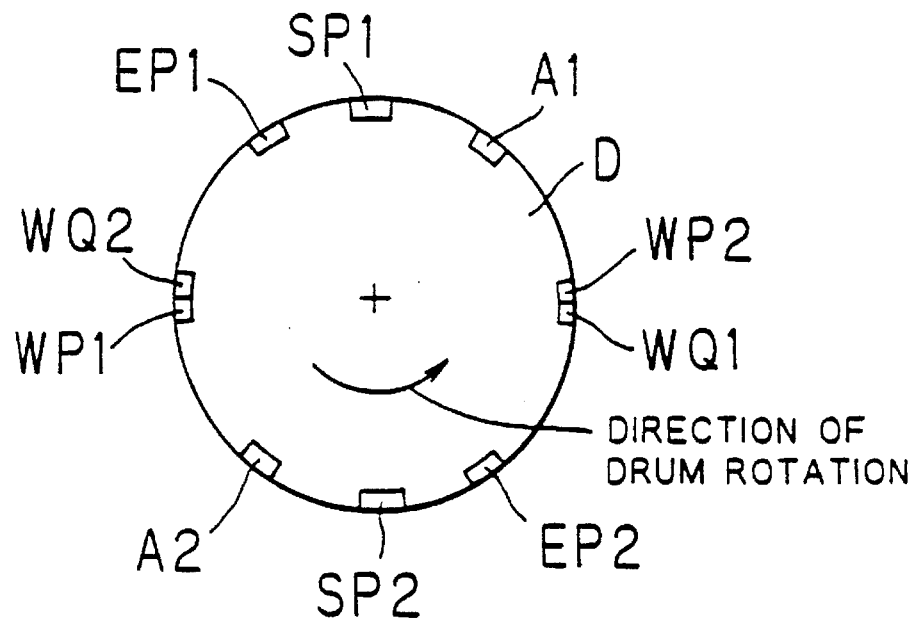
FIGS. 2(A) and 2(B) are top plan views for explaining respective head arrangements on rotary drums in embodiments according to the present invention.
Figure 2B:
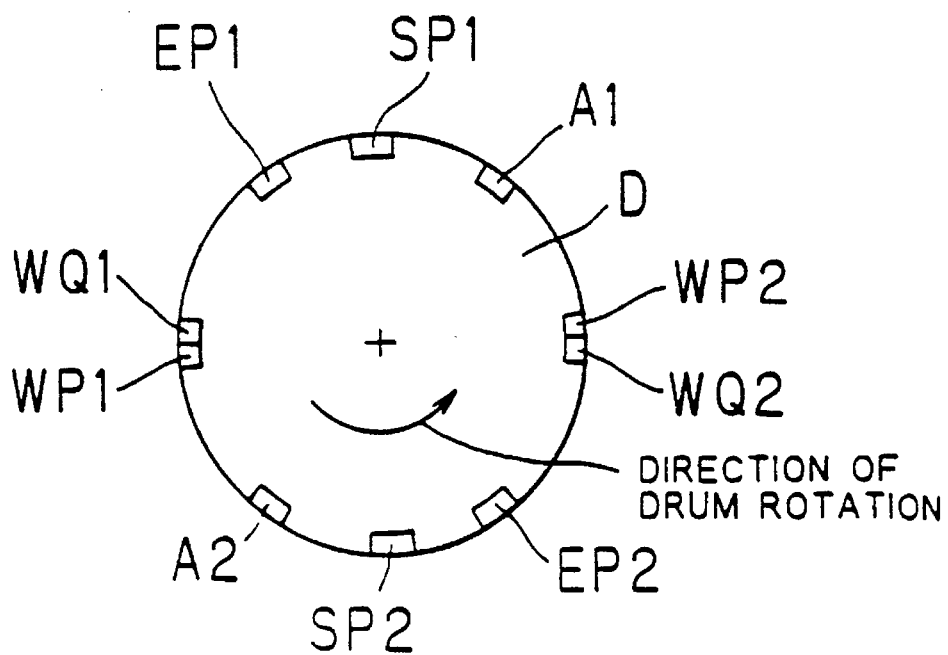

In the present embodiment, moreover, VHS type audio heads A1 and A2 are used in the wide mode, too, and video heads are newly exemplified by the double azimuth heads composed of a combination of WP1 and WP2 and a combination of WQ1 and WQ2 and are arranged over a rotary drum D, as shown in FIGS. 2(A) and 2(B).

Here can be conceived first and second embodiments by the relations among the audio heads A1 and A2, the video heads WP1 and WP2 and the video heads WQ1 and WQ2 according to the combination of the heads for recording/reproducing signals of one field. FIG. 2(A) corresponds to the first embodiment, and FIG. 2(B) corresponds to the second embodiment.

Incidentally, in case the high definition video signals to be recorded/reproduced in the wide mode are the High Definition TV system signals (although the NTSC signals of 59.94 Hz are also recorded at the standard play tape velocity in the wide mode), their field frequency takes a value of 60 Hz which is different from the field frequency of 59.94 Hz of the NTSC signals of the prior art, so that the rotation periods of the drum making one rotation for one field period are slightly different between the two. However, since their running velocities are equal, the change required in the servo system is so little that the difference can be neglected when the tape pattern is to be determined. The following description is based upon the premise that they are identical.

Embodiment 1

Figure 4:
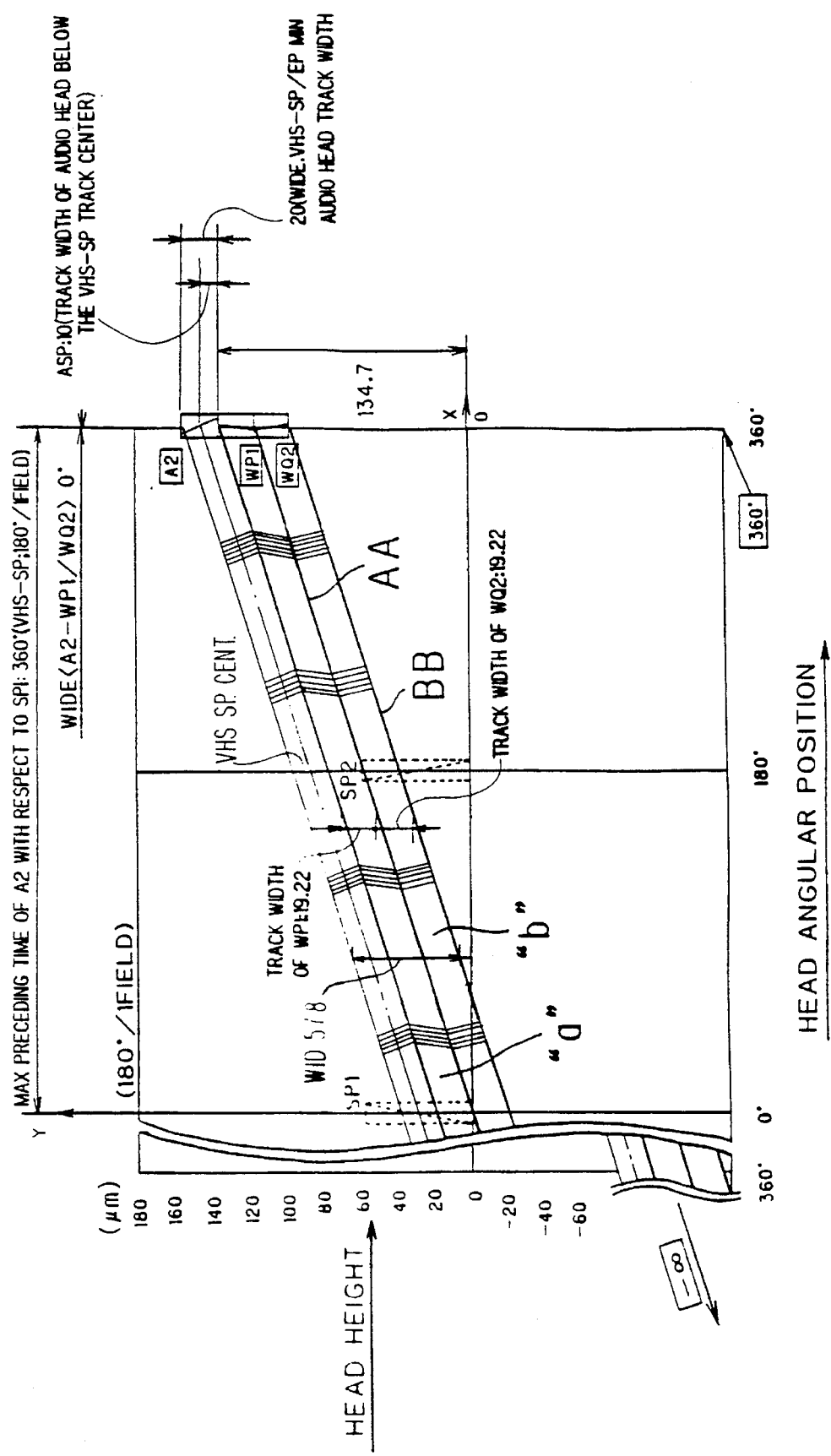
FIG. 4 is a diagram for explaining the head positioning of the first embodiment.

With reference to FIG. 4, here will be examined the positions for mounting the audio heads A1 and A2, the video heads WP1 and WP2 and the video heads WQ1 and WQ2. FIG. 4 shows the case in which the lower end edge locus of the video head WP1 and the upper end edge locus of the video head WQ2 are aligned. Incidentally, suffixes "1" and "2" of the heads appearing in FIG. 4 denote the azimuth angles such that the azimuth laying from the upper right to the lower left, as horizontally taken in the longitudinal direction of the tracks, is expressed by "1" whereas the azimuth laying from the upper left to the lower right is expressed by "2". Moreover, the position of mounting the video head SP1 for the standard play mode is taken as the origin of the coordinates (having the angle "0 degrees" and the height of "0 μm").

Here will be determined the position of mounting the video head WP1 to be newly added. Here, it is assumed that the video heads WP1 and WP2 and the video heads WQ1 and WQ2 have azimuth angles different from those of the audio heads A1 and A2, the video heads SP1 and SP2 and video heads EP1 and EP2. The standard line SPTC (i.e., VHS SP, Center.), as shown in FIG. 4, indicates the track center of the video head SP1 in the standard play mode. If one track pitch of the standard play mode is denoted by "SPTP", the standard line can be expressed by Equation 1 because it has a gradient "SPTP" per 180 degrees and a Y segment of SPTP/2.

$$Y=(SPTP/180)\cdot X+SPTP/2 \qquad \text{Eq. 1:}$$

A straight line AA containing the lower end edge of the head WP1 to be mounted below the head A2 is expressed by Equation 2 because it is formed by displacing the standard line SPTC by SPTC/2 μm in parallel in the negative direction with respect to the Y-axis.

$$Y=(SPTP/180)\cdot X \qquad \text{Eq. 2:}$$

A straight line BB containing the lower end edge of the head WQ2 to be mounted below the head WP1 is expressed by Equation 3 because it is formed by displacing the straight line AA by EPTP μm in parallel in the negative direction with respect to the Y-axis, if the value EPTP is assumed to express the track pitch and width of the heads WP1 and WQ2.

$$Y=(SPTP/180)\cdot X-EPTP \qquad \text{Eq. 3:}$$

Moreover, the maximum ranges for mounting the head WP1 and WP2 correspond to the case, in which the head A2 precedes the head SP1, which has been described in the aforementioned VHS standard (2), by two fields so that the audio signals may be recorded while preceding the video signals and that the heads A1 and A2 may be shared with the VHS system. Thus, the head WP1 may be mounted in a region, as indicated at "a" by solid lines in FIG. 4, whereas the head WQ2 may be mounted in a region "b".

Moreover, the audio heads A1 and A2 of the VHS system can be shared as the common audio heads in the wide mode by mounting the head WP2 in a position at the same level as the head WP1 and spaced by 180 degrees and by mounting the head WQ1 in a position at the same level as the head WQ2 and spaced by 180 degrees.

In addition, the lower end edge locus of the head WP1 and the upper end edge locus of the head WQ2 are arranged to align on the tape patterns so that the cross talk between the video tracks can be suppressed. Moreover, the lower end edge locus of the video head SP1 for the standard play mode, the lower end edge locus of the head WP1 and the upper end edge locus of the head WQ2 are arranged to align on the tape patterns so that the magnetic heads can be easily mounted on the rotary drum. Specifically, the heads are ordinarily mounted by tacking the plural heads to fit the rotary drum rotatably on its spindle by means of a jig and by adjusting the height while confirming the heights of the heads vertically with respect to the spindle by means of a microscope. If the magnetic heads are arranged, as described above, a desired one can be brought into a common field of view of the microscope merely by turning the rotary drum.

Incidentally, in the description made above, the adjoining tracks have the opposite azimuth angles, as shown in FIG. 3. However, these angles should not be limitative but can naturally be set in the common direction. Moreover, some of the magnetic heads WP1 and WP2 and the magnetic heads WQ1 and WQ2 may naturally have widths exceeding the track width. In this case, too, it is also desired that the lower end edge locus of the video head SP1 for the standard play mode, the lower end edge locus of the head WP1 and the upper end edge locus of the head WQ2 are arranged to align on the tape patterns, as described above.

In the aforementioned case, the lower end edge locus of the head WP1 and the upper end edge locus of the head WQ2 are in alignment on the tape patterns. Generally speaking, if they fail to align, the aforementioned Equations 2 and 3 are changed to the following Equations 4 and 5. Here, the value β indicates the offset value of the track lower end of VHS-SP and the straight line AA in the track pitch direction (i.e., the Y-axis direction).

$$Y=(SPTP/180)\cdot X-\beta \qquad \text{Eq. 4:}$$

$$Y=(SPTP/180)\cdot X-EPTP-\beta \qquad \text{Eq. 5:}$$

Figure 5:
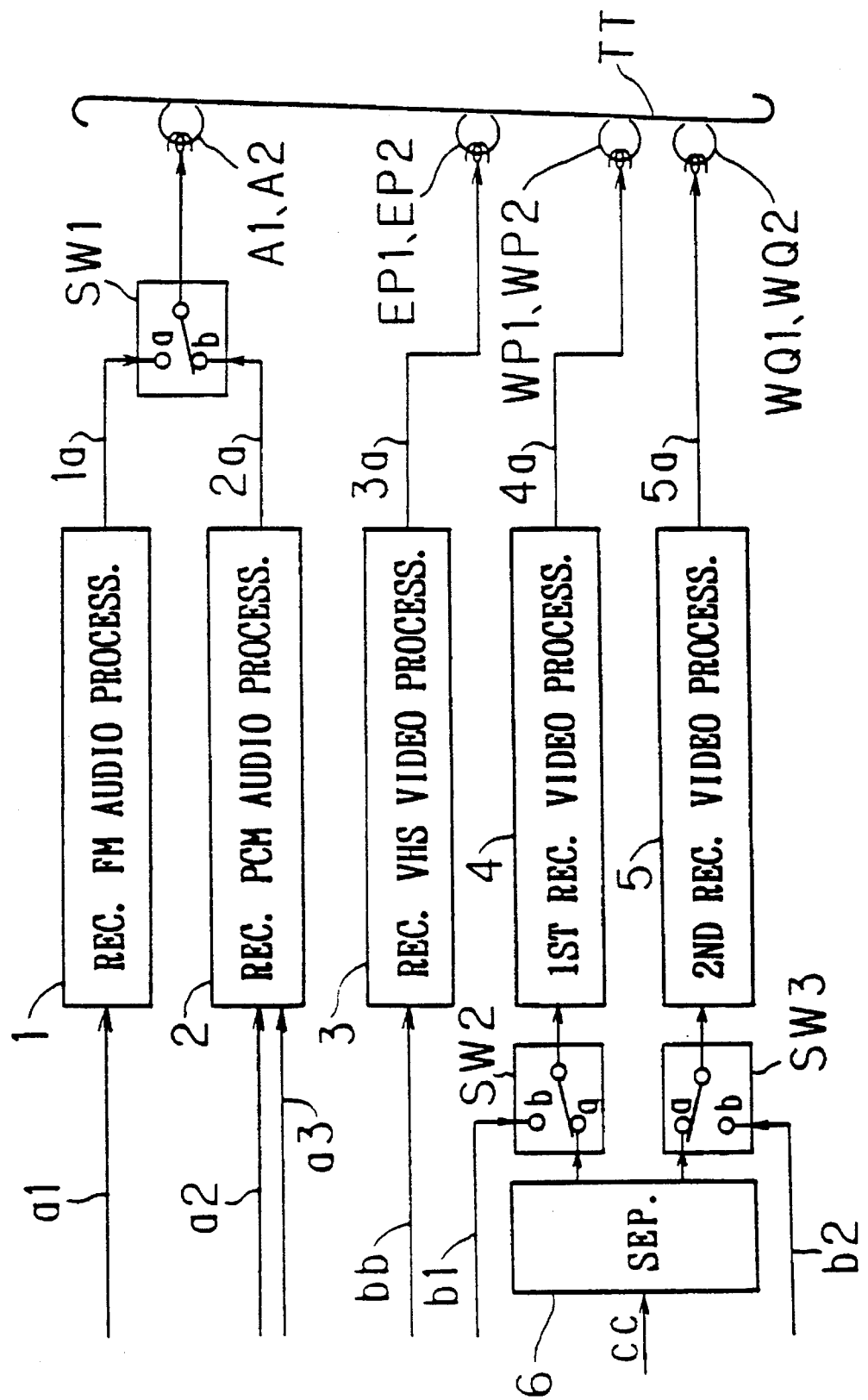
FIG. 5 is a block diagram for explaining major components of a recording signal system of the VTR according to one embodiment of the present invention.
Figure 6:
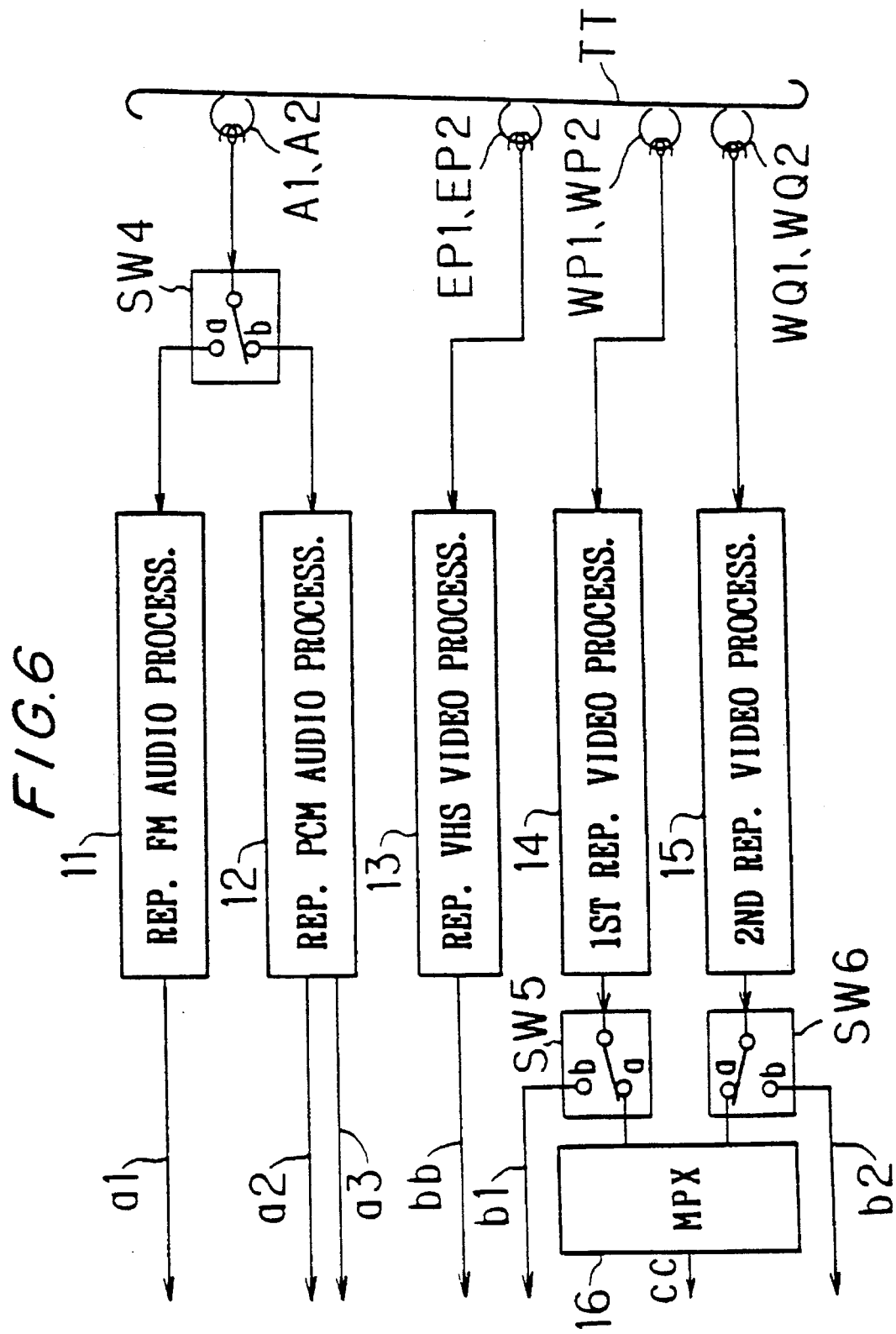
FIG. 6 is a block diagram for explaining major components of a playing signal system of the VTR according to one embodiment of the present invention.

Next, the signal system of the VTR according to the present embodiment will be described with reference to FIGS. 5 and 6. FIG. 5 shows the recording signal system according to the present embodiment. In this system, a magnetic tape TT compatible with the VHS system of the prior art is prepared, and the NTSC signal of the prior art is recorded in two programs, or a high definition video signal (e.g., a High Definition TV system signal such as the MUSE signal) is bisected and recorded.

Here will be described the case for recording an extended play mode of the VHS system of the prior art. Audio signals a1 and video signals bb are respectively fed through not-shown transmission lines to recording FM audio processor 1 and recording VHS video processor 3. The recording FM audio processor 1 processes the audio signals a1 by a pre-emphasis and an FM modulation to produce recording audio signals 1a, which are then fed to a first switch circuit SW1. In the recording operation in the extended play mode, moreover, the first switch circuit SW1 has its movable contact connected with a contact "a" so that the aforementioned recording audio signals 1a are fed to the audio heads A1 and A2 and recorded in a deeper portion of the magnetic layer of the magnetic tape TT while preceding the heads EP1 and EP2 in the recording.

In the recording VHS video processor 3, on the other hand, the video signal is separated into a luminance signal and a chroma signal as in the aforementioned technology of the prior art. These luminance and chroma signals are individually subjected to predetermined recording treatments to produce the down-converted (frequency) chroma signals and the FM luminance signals. These treated signals have their frequencies multiplexed to produce recording video signals 3a, which are fed to the video heads EP1 and EP2 and recorded in the surface layer of the magnetic tape TT.

In the recording operation of high definition video signals cc in the wide mode, on the other hand, audio signals a2 and the high definition video signals cc are respectively fed through not-shown transmission lines to recording PCM audio processor 2 and separator 6. The audio signals a2 are processed by the recording PCM audio processor 2 to have an error correction code such as Reed Solomon code added thereto and to have a modulation of 4-phase PSK thereby to produce recording PCM audio signals 2a, which are then fed to the first switch circuit SW1. In the recording operation in the wide mode, moreover, the first switch circuit SW1 has its movable contact connected with the contact "a" so that the aforementioned recording PCM audio signals 2a are fed to the audio heads A1 and A2 and recorded in the magnetic tape TT while preceding the heads EP1 and EP2 and the heads WP1 and WP2 in the recording operation.

In the separator 6, on the other hand, the high definition video signals cc are separated for each scanning line into two kinds of signals to produce first and second separated signals thereby to reduce the bands into halves. Incidentally, this separation may naturally include the so-called "TCI processing". These first and second separated signals are fed to second and third switch circuits SW2 and SW3. In case of recording the high definition video signals cc, the second and third switch circuits SW2 and SW3 have their movable contacts connected with the contact "a" to feed the first and second divided signals to first and second recording video processor 4 and 5. These first and second recording video processors 4 and 5 execute a recording video processing such as an emphasis or FM modulation to produce first and second recording video signals 4a and 5a. These video signals 4a and 5a are then fed to the heads WP1 and WP2 and the heads WQ1 and WQ2 and are recorded in the magnetic tape TT.

Moreover, in case video signals of the NTSC system are to be subjected to a two-program recording in the wide mode, the audio signals a2 and a3 and first and second video signals b1 and b2 are respectively fed to the recording PCM audio processor 2 and the second and third switch circuits SW2 and SW3. In the recording PCH audio processor 2, the audio signals a2 and a3 are subjected to the above-specified processings, and the treated signals are subjected to a time sharing multiplex processing or a frequency multiplex processing to produce the recording PCM audio signals 2a. On the other hand, the first and second video signals b1 and b2 are fed through the contacts "b" and movable contacts of the second and third switch circuits SW2 and SW3 to the first and second recording video signal processors 4 and 5 so that they are recorded in the two-program fashion in the magnetic tape TT after the above-specified processings.

Incidentally, in the recording signal system described above, the recording operation can be effected by inserting into the vertical blanking period of the video signals a signal for deciding whether the recording signals are the high definition video signals or the two-program recorded signals. This decision signal may vary the duty ratio of a control signal.

Next, the reproducing signal system of the VTR system according to the present embodiment will be described with reference to FIG. 6. Here will be described the case, in which the aforementioned decision signal is detected by not-shown decision signal detecting device to obtain a result that the mode is the extended play mode of the VHS system of the prior art. The signals reproduced by the audio heads A1 and A2 are fed through the movable contact and the contact "a" of a fourth switch circuit SW4 to reproducing FM audio processor 11, in which they are subjected to a reproducing processing such as an FM demodulation and a de-emphasis to produce and output the audio signals a1 to a not-shown transmission line. On the other hand, the signals reproduced by the video heads EP1 and EP2 are fed to reproducing VHS video processor 13 so that the video signals bb thus producing in the known manner are reproduced and outputted to a not-shown transmission line.

In case the result of the decision signals reveals the high definition video signals, on the other hand, the signals reproduced by the audio heads A1 and A2 are fed through the movable contact and contact "b" of the fourth switch circuit SW4 to reproduction PCM audio processor 12, in which they are subjected to the 4-phase PSK demodulation and the error correction to reproduce and output the audio signals a2 to the not-shown transmission line. On the other hand, the signals reproduced by the video heads WP1 and WP2 are fed to first reproduction video processor 14, and the signals reproduced by the video heads WQ1 and WQ2 are fed to second reproduction video processor 15. And the first and second separate signals are produced by the reproducing video processing such as the FM demodulation and the de-emphasis and are fed through the movable contacts and the contacts "a" of fifth and sixth switch circuits SW5 and SW6 to a multiplexer (MPX) 16 which is in complementary relation to the separator 6. Then, the first and second separated signals are multiplexed by the multiplexer (MPX) 16 to produce and output the high definition video signal cc to the not-shown transmission line.

In case, moreover, the result of the decision signals reveal that the video signals of the NTSC system are to be reproduced in the two-program fashion, the signals reproduced by the audio heads A1 and A2 are fed through the movable contact and the contact "b" of the fourth switch circuit SW4 to the reproduction PCM audio processor 12. In this processor 1Z, the reproduced signals are subjected to the 4-phase PSK demodulation and the error correction and are separated so that the resultant audio signals a2 and a3 are reproduced and outputted to the not-shown transmission line. On the other hand, the first and second separate signals reproduced by the first and second reproduction video processors 14 and 15 are fed to the fifth and sixth switch circuits SW5 and SW6 so that they are reproduced and outputted as the first and second video signals b1 and b2 through the not-shown transmission line to the movable contact and the contact "b".

Thus, the VTR system according to the present embodiment has effects that it can record/reproduce the video signals of the NTSC system by the VHS system of the prior art and that it can record/produce the high definition video signals or the video signals of the NTSC system in the two-program fashion.

Embodiment 2

Figure 7:
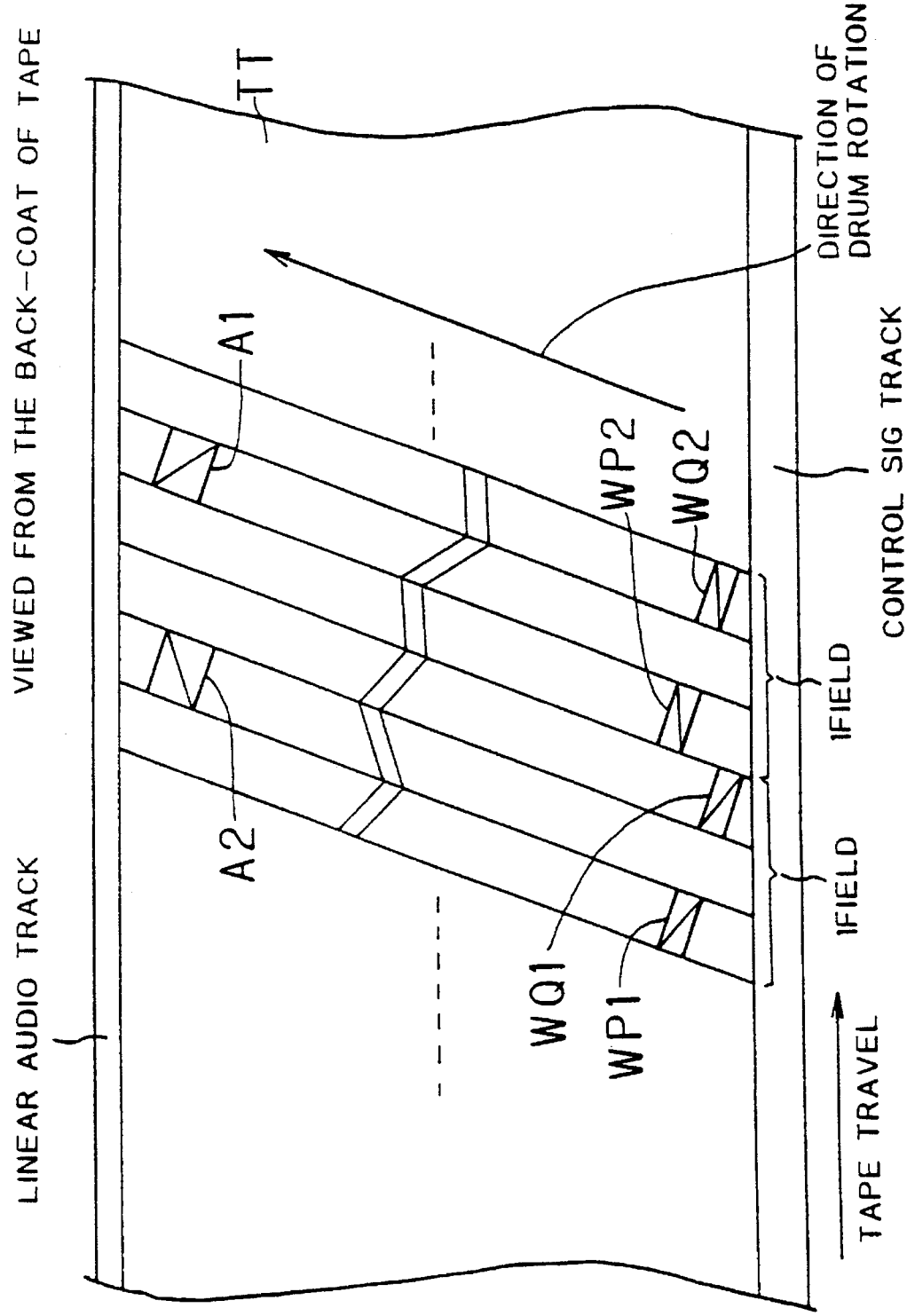
FIG. 7 is a block diagram for explaining a tape pattern in a wide mode in a second embodiment.

In this second embodiment, the three tracks composing one field in the wide mode are set, as shown in FIG. 7, such that the audio specialized track relating to the audio heads A1 and A2 is interposed between the video tracks. In the first embodiment, moreover, the video tracks of one field relating to the video heads SP1 and SP2 for the standard play mode have failed to align with the three tracks composing one field in the wide mode because of the relations in the VHS standards between the heads SP1 and SP2 and the heads A1 and A2. In the second embodiment, however, the alignment can be achieved so that the flying erasing heads for the VHS standard play mode can also be used for the wide mode. Incidentally, the signal system of the second embodiment is identical to that of the first embodiment, and its description will be omitted.

Figure 8:
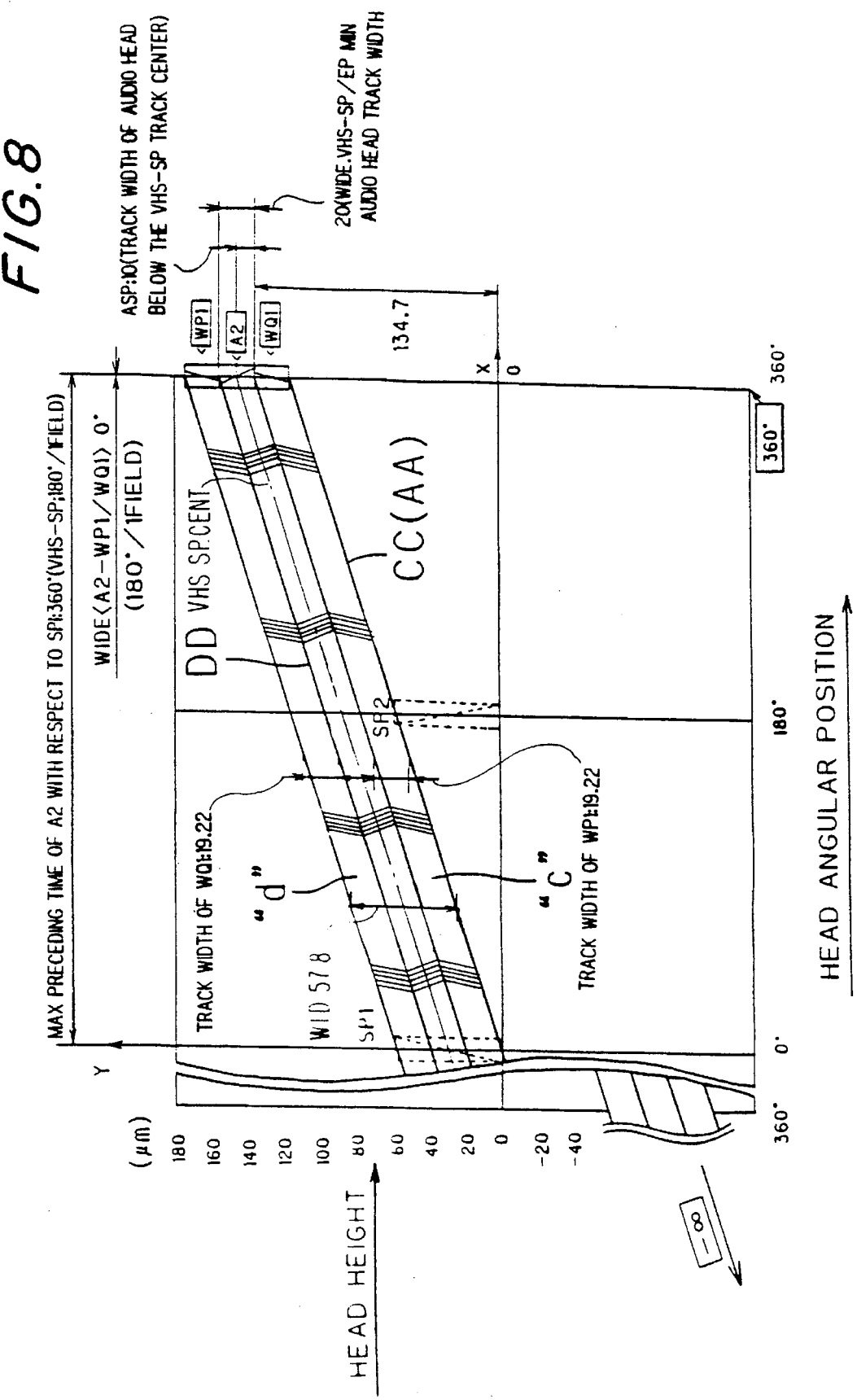
FIG. 8 is a diagram for explaining the head positioning of the second embodiment.

The positions for mounting the audio heads A1 and A2, the video heads WP1 and WP2 and the video heads WQ1 and WQ2 will be examined with reference to FIG. 8. Incidentally, suffixes "1" and "2" of the heads appearing in FIG. 8 denote the azimuth angles such that the azimuth of downward to the left, as horizontally taken in the longitudinal direction of the tracks, is expressed by "1" whereas the azimuth of upward to the right is expressed by "2". Moreover, the position of mounting the video head SP1 for the standard play mode is taken as the origin of the coordinates (having the angle "0 degrees" and the height of "0 µm").

Here will be determined the position for mounting the video head WQ1 to be newly added to below the audio head A2. The standard line SPTC (i.e., VHS SP. Cent.) indicating the track center of the video head SP1 for the standard play mode can be expressed by Equation 6 as in the aforementioned Equation 1.

$$Y = (SPTP/180) \cdot X + SPTP/2 \qquad \text{Eq. 6:}$$

Moreover, a straight line CC containing the lower end edge of the head WQ1 to be mounted below the head A2 is aligned with the aforementioned straight line AA and can be expressed by Equation 7 as in Equation 2.

$$Y = (SPTP/180) \cdot X \qquad \text{Eq. 7:}$$

On the other hand, a straight line DD containing the lower end edge of the head WP1 to be mounted above the head A2 can be expressed by Equation 8 because it is formed by displacing the straight line CC by 2EPTP μm in the positive direction in parallel with respect to the Y-axis.

$$Y = (SPTP/180) \cdot X + 2EPTP \qquad \text{Eq. 8:}$$

Moreover, the maximum ranges for mounting the heads WP1 and WQ2 correspond to the case, in which the head A2 precedes the head SP1, which has been described in the aforementioned VHS standard (2), by two fields so that the audio signals may be recorded while preceding the video signals and that the heads A1 and A2 may be shared with the VHS system. Thus, the head WQ1 may be mounted in a region, as indicated at "c" by solid lines in FIG. 8, whereas the head WP1 may be mounted in a region "d".

Moreover, the audio heads A1 and A2 of the VHS system can be shared as the common audio heads in the wide mode by mounting the head WP2 in a position at the same level as the head WP1 and spaced by 180 degrees and by mounting the head WQ1 in a position at the same level as the head WQ2 and spaced by 180 degrees.

Still moreover, the lower end edge locus of the video head SP1 for the standard play mode, the lower end edge locus of the head WQ1, the upper end edge locus of the video head SP1 and the upper end edge locus of the head WP1 are arranged to align on the tape pattern so that the heads can be easily mounted by means of a microscope as in the first embodiment.

Incidentally, in the description made above, the adjoining tracks have the opposite azimuth angles, as shown in FIG. 7. However, these angles should not be limitative but can naturally be set in the common direction. Moreover, some of the magnetic heads WP1 and WP2 and the magnetic heads WQ1 and WQ2 may naturally have widths exceeding the track width. In this case, too, it is also desired for the easy mounting that the lower end edge locus of the video head SP1 for the standard play mode, the lower end edge locus of the head WQ1, the upper end edge locus of the video head SP1 and the upper end edge locus of the head WP1 are arranged to align on the tape patterns, as described above.

In the aforementioned case, the lower end edge locus of the head WP1 and the upper end edge locus of the head WQ1 are in alignment on the tape patterns. Generally speaking, if they fail to align, the aforementioned Equations 7 and 8 are changed to the following Equations 9 and 10, as in the first embodiment. Here, the value β indicates the offset value of the track lower end of VHS-SP and the straight line CC in the track pitch direction (i.e., the Y-axis direction).

$$Y = (SPTP/180) \cdot X - \beta \qquad \text{Eq. 9:}$$

$$Y = (SPTP/180) \cdot X + 2EPTP - \beta \qquad \text{Eq. 10:}$$

Embodiment 3

The foregoing first and second embodiments have described the VTR a system, in which the audio heads A1 and A2 are used commonly in the standard play mode of the VHS system and the wide mode using the three tracks as one set and in which the video heads WP1 and WP2 and the video heads WQ1 and WQ2 are newly added so that the wide mode and the VHS system may be recorded/reproduced at substantially the same tape running velocity and the same drum rotating velocity for establishing substantially the same track pitch and angle as those of the standard play mode of the VHS system. In the third embodiment, on the other hand, the video heads WP1 and WP2 and the video heads WQ1 and WQ2 are used to realize an "extended play wide mode" which is also called "modified extended-play mode" at tape running and drum rotation velocities approximately equal to those of the extended play mode of the VHS system. In the extended play wide mode, aforementioned "wide mode" is extended time wise to be "extended play mode" where one NTSC signal is subjected to a processing similar to the processing applied to the 2-program NTSC signals for recording and playback explained before.

Here in the extended play wide mode, like the aforementioned one of the VHS system, the audio signals are recorded/reproduced in the preceding manner, and the video signals are subsequently recorded/reproduced in the same tracks. Moreover, the audio heads A1 and A2 are used for the audio signals, and any pair of the magnetic heads of the video heads WP1 and WP2 or the video heads WQ1 and WQ2 is used for the video signals. In other words, the audio heads A1 and A2 are commonly used for the standard play mode of the VHS system, the extended play mode, the wide mode and the extended play wide mode. The third embodiment will be described in the following with reference to FIGS. 9 to 11.

Figure 9:
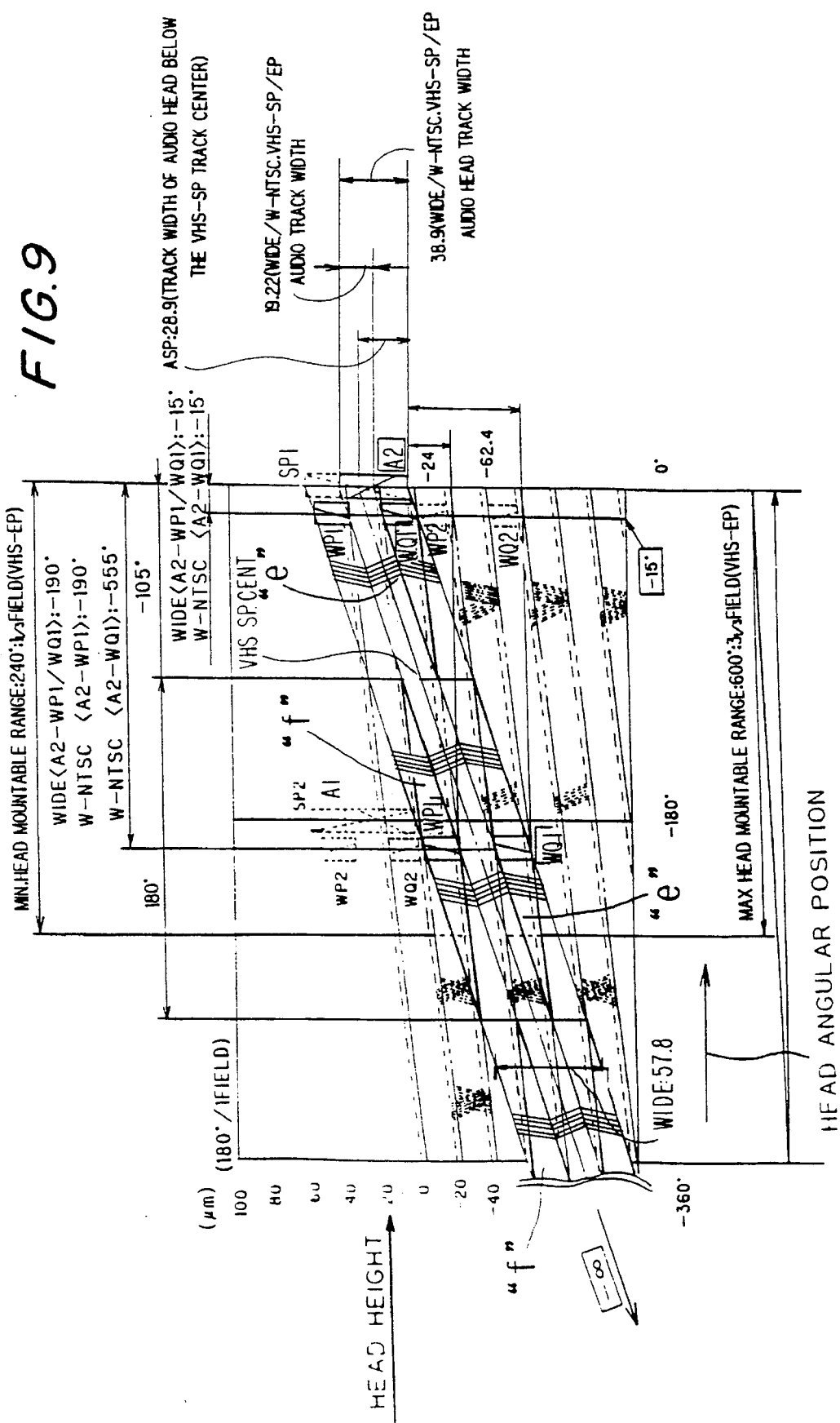
FIG. 9 is a diagram for explaining the head positioning in an extended play wide mode in a third embodiment.

First of all, the positions for mounting the video heads WP1 and WP2 and the video heads WQ1 and WQ2 will be examined with reference to FIG. 9 in case the recording time difference between the heads SP1 and A2 has a zero field. In FIG. 9, the tracks having a steep gradient are for the wide mode, whereas the tracks having a gentle gradient are for the extended play wide mode. The heads WP1 and WQ1 can be mounted in the region "e", as indicated by thick lines in FIG. 9, because they have to be mounted in the positions in which they can form the two tracks. On the other hand, the head WP1 can be mounted in the region "f".

Figure 10:
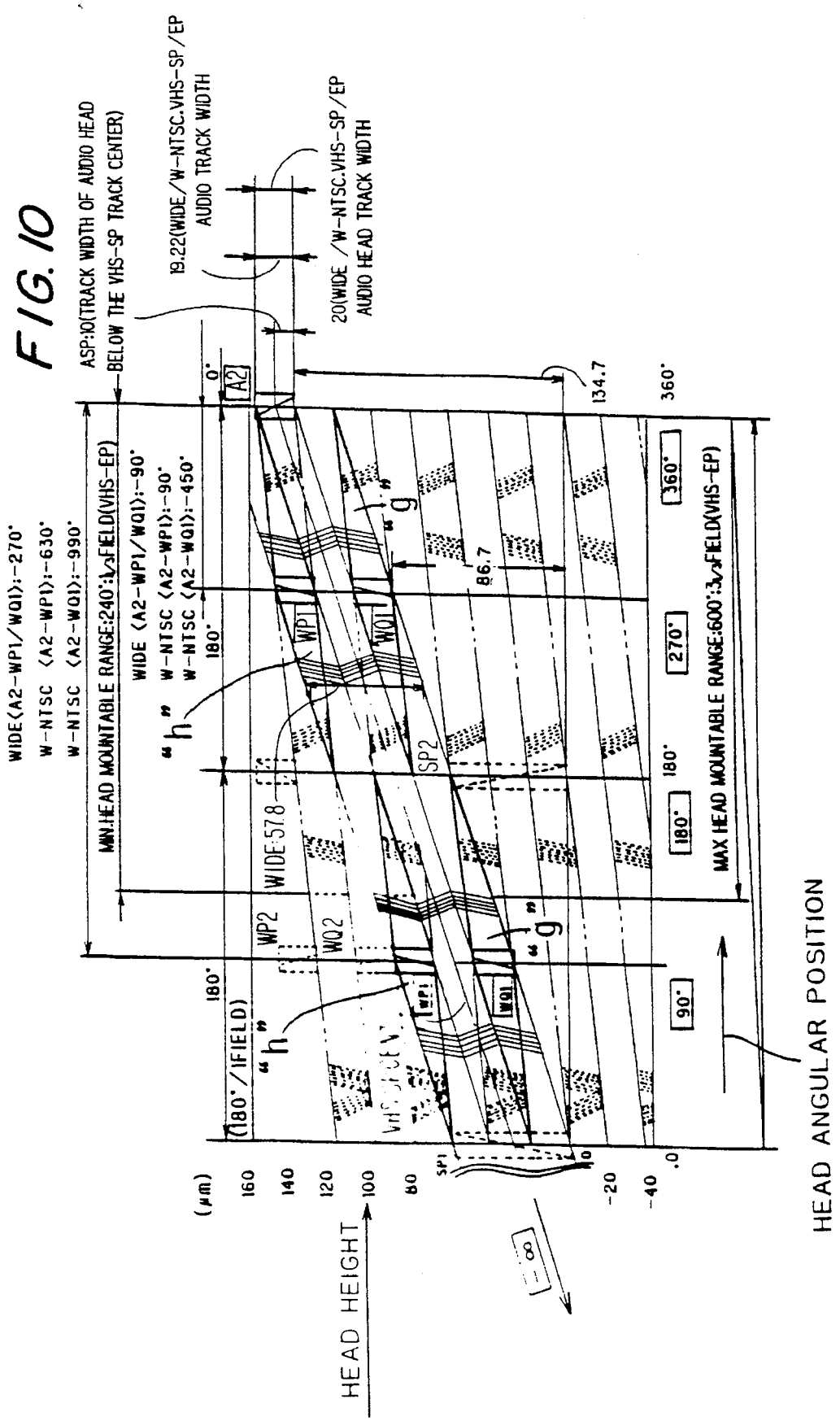
FIG. 10 is a diagram for explaining the head positioning in the extended play wide mode in the third embodiment.

Next, the positions for mounting the video heads WP1 and WP2 and the video heads WQ1 and WQ2 will be examined with reference to FIG. 10 in case the recording time difference between the heads SP1 and A2 has two fields. In this case, like the case of the zero field, the head WQ1 can be mounted in a region "g", as indicated by thick lines in FIG. 10, whereas the head WP1 can be mounted in a region "h". Incidentally, the individual regions, as indicated at "e" to "h" in FIGS. 9 and 10, can be specified by determining the intersections of the straight lines as in the foregoing first and second embodiments.

Figure 11:
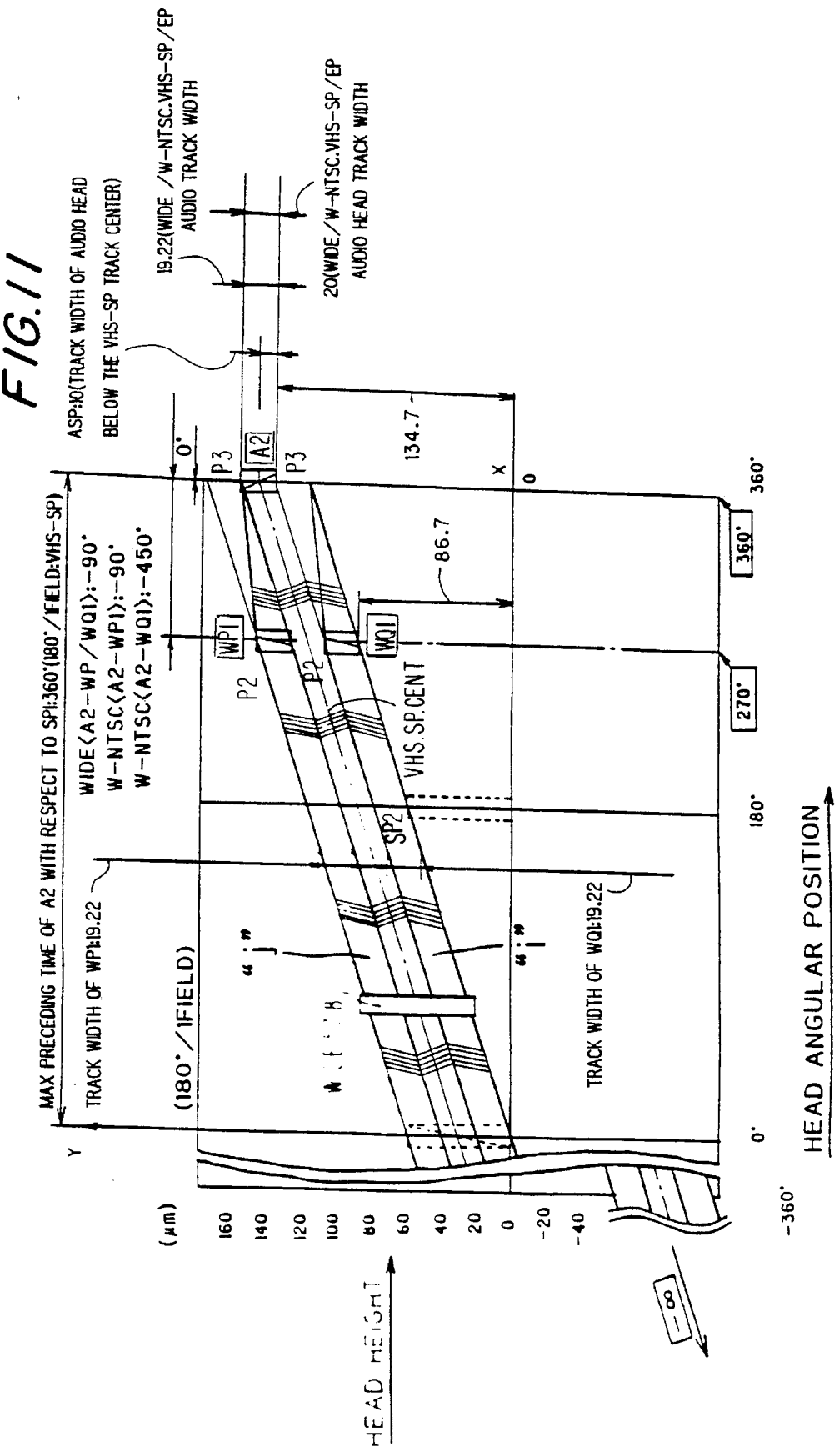
FIG. 11 is a diagram for explaining the head positioning of FIGS. 9 and 10 together.

Now, the aforementioned cases of the zero field and the two fields will be integrated to FIG. 11. After all, the head WQ1 can be mounted in a region "i", as indicated by thick lines in FIG. 11, whereas the head WP1 can be mounted in a region "j".

Thus, the audio heads A1 and A2 of the VHS system can also be used as those in the extended play wide mode by mounting the head WP2 at the same height as that of the head WP1 and at a spacing 180 degrees and the head WQ2 at the same height as that of the head WQ1 and at a spacing of 180 degrees.

Embodiment 4

Although the aforementioned third embodiment corresponds to the foregoing second embodiment, the fourth embodiment relates to the extended play wide mode corresponding to the foregoing first embodiment. The video heads WP1 and WP2 and the video heads WQ1 and WQ2 are used to extend the wide mode at the same tape running velocity and drum rotating velocity as those of the extended play mode of the VHS system.

Here in the extended play wide mode, the audio signals are recorded/reproduced in precedence as in the aforementioned extended play mode of the VHS system, and the video signals are subsequently recorded/reproduced in the same tracks. Moreover, the audio heads A1 and A2 are used for the audio signals, and either the video heads WP1 and WP2 or the video heads WQ1 and WQ2 are used for the video signals. In other words, the audio heads A1 and A2 are commonly used for the standard play mode of the VHS system, the extended play mode, the wide mode and the extended play wide mode. The fourth embodiment will be described in the following with reference to FIGS. 12 to 17.

Figure 12:
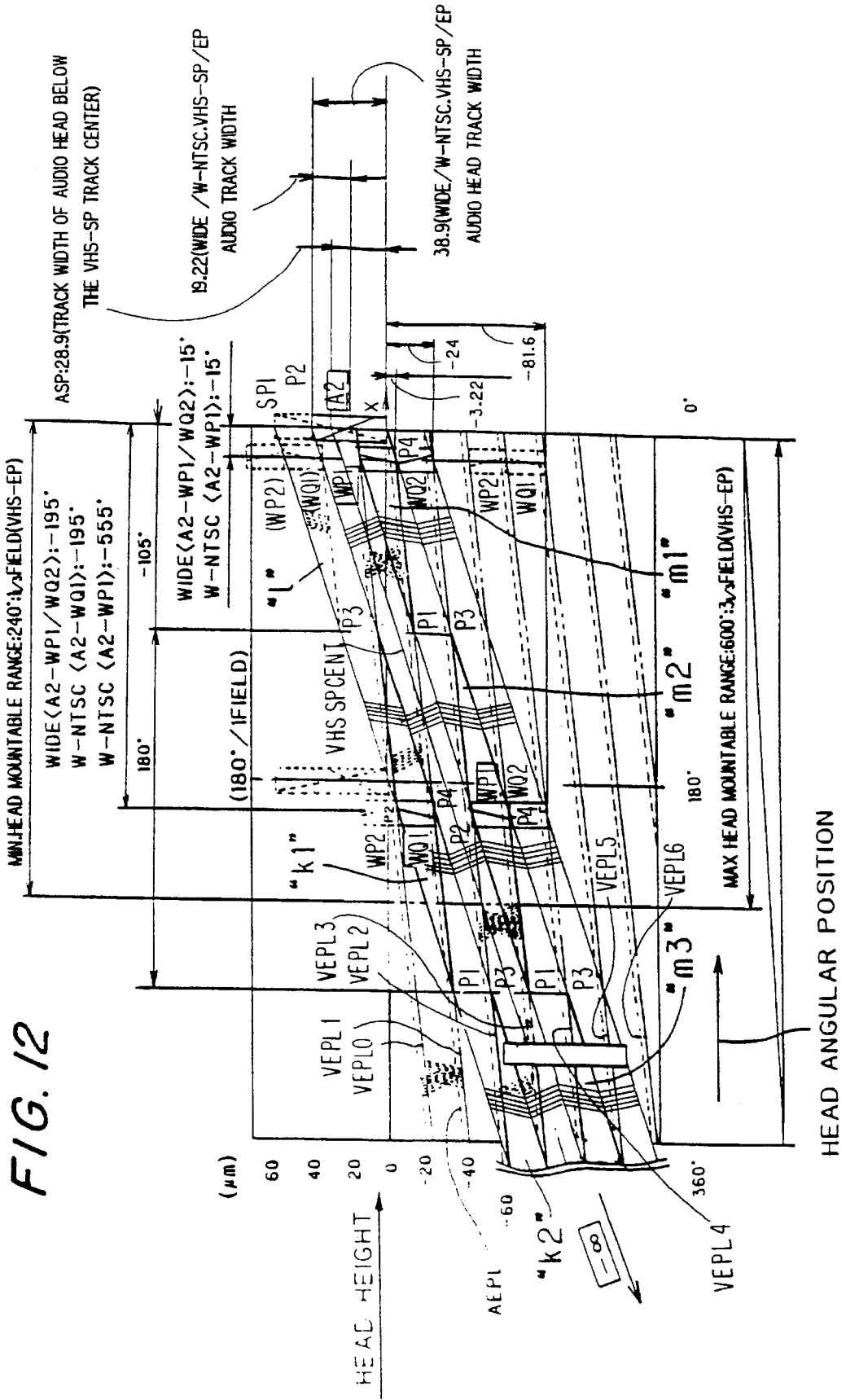
FIG. 12 is a diagram for explaining the head positioning in an extended play wide mode in a fourth embodiment.

First of all, the positions for mounting the video heads WP1 and WP2 and the video heads WQ1 and WQ2 will be examined with reference to FIG. 12 in case the recording time difference between the heads SP1 and A2 has the zero field. In FIG. 12, the tracks having a steep gradient are for the wide mode, whereas the tracks having a gentle gradient are for the extended play wide mode. The head WQ1 can be mounted in regions "k1" and "k2", as indicated by thick lines in FIG. 12, because it has to be mounted in a position capable of forming two tracks. Here, a region "1" does not provide the mountable position partly because the preceding recording is not achieved in the wide mode for the shown head width of the head A2 and partly because it is erased by the head succeeding by 180 degrees even if the head A2 is widened for the preceding recording operation. On the other hand, the head WP1 can be mounted in region "m1" to "m3". Here, the individual apexes P1 to P4 of a parallelogram regions "k1", "k2" and "m1" to "m3" will be determined in the following.

The individual apexes P1 to P4 of the region "m1" may be determined by deciding the intersections of two straight lines L1 and L2. That is: the straight line for determining the apex P1 is expressed by the following Equations 11 and 12; the straight line for determining the apex P2 is expressed by the following Equations 13 and 14; the straight line for determining the apex P3 is expressed by the following Equations 15 and 16; and the straight line for determining the apex P4 is expressed by the following Equations 17 and 18.

$$L1 = VSPL(X) + EPTP \quad \text{Eq. 11:}$$
$$= (SPTP/180) \cdot X + EPTP$$

$$L2 = VEPL1(X) \quad \text{Eq. 12:}$$
$$= AEPL(X) - \Delta AV$$
$$= (EPTP/180) \cdot X + Y_o - \Delta AV$$

$$L1 = VSPL(X) + EPTP \quad \text{Eq. 13:}$$
$$= (SPTP/180) \cdot X + EPTP$$

$$L2 = VEPL0(X) \quad \text{Eq. 14:}$$
$$= AEPL(X) - \Delta AV - EPTP$$
$$= (EPTP/180) \cdot X + Y_o - \Delta AV + EPTP$$

$$L1 = VSPL(X) \quad \text{Eq. 15:}$$
$$= (SPTP/180) \cdot X$$

$$L2 = VEPL0(X) \quad \text{Eq. 16:}$$
$$= (SPTP/180) \cdot X + Y_o - \Delta AV - EPTP$$

$$L1 = VSPL(X) \quad \text{Eq. 17:}$$
$$= (SPTP/180) \cdot X$$

$$L2 = VEPL1(X) \quad \text{Eq. 18:}$$
$$= (EPTP/180) \cdot X + Y_o - \Delta AV$$

Moreover, if the apexes P1 to P4 have X and Y coordinates of $X_1$ to $X_4$ and $Y_1$ to $Y_4$, Equations 11 to 18 can be reformed into the following more general Equations 19 to 26.

$$X_1 = \{180/(SPTP-EPTP)\} \cdot (Y_o - \Delta AV - EPTP) \quad \text{Eq. 19:}$$

$$Y_1 = (SPTP/180) \cdot X_1 + EPTP \quad \text{Eq. 20:}$$

$$X_2 = \{180/(SPTP-EPTP)\} \cdot (Y_o - \Delta AV) \quad \text{Eq. 21:}$$

$$Y_2 = (SPTP/180) \cdot X_2 + EPTP \quad \text{Eq. 22:}$$

$$X_3 = \{180/(SPTP-EPTP)\} \cdot (Y_o - \Delta AV - EPTP) \quad \text{Eq. 23:}$$

$$Y_3 = (SPTP/180) \cdot X_3 \quad \text{Eq. 24:}$$

$$X_4 = \{180/(SPTP-EPTP)\} \cdot (Y_o - \Delta AV) \quad \text{Eq. 25:}$$

$$Y_4 = (SPTP/180) \cdot X_4 \quad \text{Eq. 26:}$$

Here: SPTP=57.8 μm; $Y_o$=0 degrees; and $\Delta AV$=3.22 μm. Thus, $X_1$=−104.7 degrees; $Y_1$=−14.4 μm; $X_2$=−15.0 degrees; $Y_2$=14.4 μm; $X_3$=74.6 degrees; $Y_3$=24.0 μm; $X_4$=−15.0 degrees; and $Y_4$=−4.8 μm.

The individual apexes P1 to P4 of the region "k1" may be determined by deciding the intersections of two straight lines L1 and L2. That is: the straight line for determining the apex P1 is expressed by the following Equations 27 and 28; the straight line for determining the apex P2 is expressed by the following Equations 29 and 30; the straight line for determining the apex P3 is expressed by the following Equations 31 and 32; and the straight line for determining the apex P4 is expressed by the following Equations 33 and 34.

$$L1 = VSPU(X) \quad \text{Eq. 27:}$$
$$= (SPTP/180) \cdot X + SPTP$$

$$L2 = VEPL1(X) \quad \text{Eq. 28:}$$
$$= AEPL(X) - \Delta AV$$
$$= (EPTP/180) \cdot X + Y_o - \Delta AV$$

$$L1 = VSPU(X) \quad \text{Eq. 29:}$$
$$= (SPTP/180) \cdot X + SPTP$$

$$L2 = VEPL0(X) \quad \text{Eq. 30:}$$
$$= AEPL(X) - \Delta AV - EPTP$$
$$= (EPTP/180) \cdot X + Y_o - \Delta AV + EPTP$$

$$L1 = VSPU(X) - EPTP \quad \text{Eq. 31:}$$
$$= (SPTP/180) \cdot X + SPTP - EPTP$$

$$L2 = VEPL0(X) \quad \text{Eq. 32:}$$
$$= AEPL(X) - \Delta AV - EPTP$$
$$= (EPTP/180) \cdot X + Y_o - \Delta AV - EPTP$$

$$L1 = VSPU(X) - EPTP \quad \text{Eq. 33:}$$
$$= (SPTP/180) \cdot X + SPTP - EPTP$$

$$L2 = VEPL1(X) \quad \text{Eq. 34:}$$
$$= AEPL(X) - \Delta AV$$
$$= (EPTP/180) \cdot X + Y_o - \Delta AV$$

Moreover, if the apexes P1 to P4 have X and Y coordinates of $X_1$ to $X_4$ and $Y_1$ to $Y_4$, Equations 27 to 34 can be reformed into the following more general Equations 35 to 42.

$X_1=\{180/(SPTP-EPTP)\} \cdot (Y_o-\Delta AV-SPTP)$  Eq. 35:

$Y_1=(EPTP/180) \cdot X_1+SPTP$  Eq. 36:

$X_2=\{180/(SPTP-EPTP)\} \cdot (Y_o-\Delta AV-SPTP+EPTP)$  Eq. 37:

$Y_2=(SPTP/180) \cdot X_2+SPTP$  Eq. 38:

$X_3=\{180/(SPTP-EPTP)\} \cdot (Y_o-\Delta AV-SPTP+2EPTP)$  eq. 39:

$Y_3=(SPTP/180) \cdot X_3+SPTP-EPTP$  Eq. 40:

$X_4=\{180/(SPTP-EPTP)\} \cdot (Y_o-\Delta AV-SPTP+EPTP)$  Eq. 41:

$Y_4=(SPTP/180) \cdot X_4+SPTP-EPTP$  Eq. 42:

Here: SPTP=57.8 μm; $Y_o$=0 degrees; and ΔAV=3.22 μm. Thus, $X_1$=−284.7 degrees; $Y_1$=−33.6 μm; $X_2$=−195.0 degrees; $Y_2$=−4.8 μm; $X_3$=−105.4 degrees; $Y_3$=4.7 μm; $X_4$=− 195.0 degrees; and $Y_4$=−24.0 μm.

The individual apexes P1 to P4 of the region "m2" may be determined by deciding the intersections of two straight lines L1 and L2. That is: the straight line for determining the apex P1 is expressed by the following Equations 43 and 44; the straight line for determining the apex P2 is expressed by the following Equations 45 and 46; the straight line for determining the apex P3 is expressed by the following Equations 47 and 48; and the straight line for determining the apex P4 is expressed by the following Equations 49 and 50. Incidentally, letters ASP appearing in Equation 46 indicates the audio head width below the VHS. SP. Cent.

$L1 = VSPL(X) + EPTP$  Eq. 43:
$= (SPTP/180) \cdot X + EPTP$ $L2 = VEPL3(X)$  Eq. 44:
$= AEPL(X) - \Delta AV - 2EPTP$
$= (EPTP/180) \cdot (X - X_o) + Y_o - (\Delta AV + 2EPTP)$ $L1 = VSPL(X) + EPTP$  Eq. 45:
$= (SPTP/180) \cdot X + EPTP$ $L2 = VEPL2(X)$  Eq. 46:
$= (EPTP/180) \cdot X + SPTC - ASP - (\Delta AV + EPTP)$ $L1 = VSPL(X)$  Eq. 47:
$= (SPTP/180) \cdot X$ $L2 = VEPL2(X)$  Eq. 48:
$= (EPTP/180) \cdot X + SPTC - ASP - (\Delta AV + EPTP)$ $L1 = VSPL(X)$  Eq. 49:
$= (SPTP/180) \cdot X$ $L1 = VEPL3(X)$  Eq. 50:
$= AEPL(X) - \Delta AV - 2EPTP$
$= (EPTP/180) \cdot (X - X_o) + Y_o - (\Delta AV + 2EPTP)$ Moreover, if the apexes P1 to P4 have X and Y coordinates of $X_1$ to $X_4$ and $Y_1$ to $Y_4$, Equations 43 to 50 can be reformed into the following more general Equations 51 to 58.

$X_1=\{180/(SPTP-EPTP)\} \cdot (Y_o-\Delta AV-3EPTP)$  Eq. 51:

$Y_1=(SPTP/180) \cdot X_1+EPTP$  Eq. 52:

$X_2=\{180/(SPTP-EPTP)\} \cdot (Y_o-\Delta AV-3EPTP)$  Eq. 53:

$Y_2=(SPTP/180) \cdot X_2+EPTP$  Eq. 54:

$X_3=\{180/(SPTP-EPTP)\} \cdot (Y_o-\Delta AV-EPTP)$  Eq. 55:

$Y_3=(SPTP/180) \cdot X_3$  Eq. 56:

$X_4=\{180/(SPTP-EPTP)\} \cdot (Y_o-\Delta AV-2EPTP)$  Eq. 57:

$Y_4=(SPTP/180) \cdot X_4$  Eq. 58:

Here: SPTP=57.8 μm; $Y_o$=0 degrees; and ΔAV=3.22 μm. Thus, X1=−284.0 degrees; $Y_1$=−72.0 μm; $X_2$=−194.3 degrees; $Y_2$=−43.2 μm; $X_3$=−104.7 degrees; $Y_3$=−33.6 μm; $X_4$=−194.3 degrees; and $Y_4$=−62.4 μm.

The individual apexes P1 to P4 of the region "k2" may be determined by deciding the intersections of two straight lines L1 and L2. That is: the straight line for determining the apex P1 is expressed by the following Equations 59 and 60; the straight line for determining the apex P2 is expressed by the following Equations 61 and 62; the straight line for determining the apex P3 is expressed by the following Equations 63 and 64; and the straight line for determining the apex P4 is expressed by the following Equations 65 and 66.

$L1 = VSPU(X)$  Eq. 59:
$= (SPTP/180) \cdot X + SPTP$ $L2 = VEPL3(X)$  Eq. 60:
$= AEPL(X) - \Delta AV - 2EPTP$
$= (EPTP/180) \cdot X + Y_o - \Delta AV - 2EPTP$ $L1 = VSPU(X)$  Eq. 61:
$= (SPTP/180) \cdot X + SPTP$ $L2 = VEPL2(X)$  Eq. 62:
$= VEPL3(X) + EPTP$
$= (EPTP/180) \cdot X + Y_o - \Delta AV - EPTP$ $L1 = VSPU(X) - EPTP$  Eq. 63:
$= (SPTP/180) \cdot X + SPTP - EPTP$ $L2 = VEPL2(X)$  Eq. 64:
$= (EPTP/180) \cdot X + Y_o - \Delta AV - EPTP$ $L1 = VSPU(X) - EPTP$  Eq. 65:
$= (SPTP/180) \cdot X + SPTP - EPTP$ $L2 = VEPL3(X)$  Eq. 66:
$= (EPTP/180) \cdot X + Y_o - \Delta AV - 2EPTP$ Moreover, if the apexes P1 to P4 have X and Y coordinates of $X_1$ to $X_4$ and $Y_1$ to $Y_4$, Equations 59 to 66 can be reformed into the following more general Equations 67 to 74.

$X_1=\{180/(SPTP-EPTP)\} \cdot (Y_o-\Delta AV-SPTP-2EPTP)$  Eq. 67:

$Y_1=(SPTP/180) \cdot X_1+SPTP$  Eq. 68:

$X_2=\{180/(SPTP-EPTP)\} \cdot (Y_o-\Delta AV-SPTP-EPTP)$  Eq. 69:

$Y_2=(SPTP/180) \cdot X_2+SPTP$  Eq. 70

$X_3=\{180/(SPTP-EPTP)\} \cdot (Y_o-\Delta AV-SPTP)$  Eq. 71:

$Y_3=(SPTP/180) \cdot X_3+SPTP-EPTP$  Eq. 72:

$X_4=\{180/(SPTP-EPTP)\} \cdot (Y_o-\Delta AV-SPTP-EPTP)$  Eq. 73:

$Y_4=(SPTP/180) \cdot X_4+SPTP-EPTP$  Eq. 74:

Here: SPTP=57.8 μm; $Y_o$=0 degrees; and ΔAV=3.22 μm. Thus, X1=−464.0 degrees; $Y_1$=−91.2 μm; $X_2$=−374.3 degrees; $Y_2$=−62.4 μm; $X_3$=−284.7 degrees; $Y_3$=−52.8 μm; $X_4$=−374.3 degrees; and $Y_4$=−81.6 μm.

The individual apexes P1 to P4 of the region "m3" may be determined by deciding the intersections of two straight lines L1 and L2. That is: the straight line for determining the apex P1 is expressed by the following Equations 75 and 76; the straight line for determining the apex P2 is expressed by the following Equations 77 and 78; the straight line for determining the apex P3 is expressed by the following Equations 79 and 80; and the straight line for determining the apex P4 is expressed by the following Equations 81 and 82.

$$L1 = VSPL(X) + EPTP \quad \text{Eq. 75:}$$
$$= (SPTP/180) \cdot X + EPTP$$

$$L2 = VEPL5(X) \quad \text{Eq. 76:}$$
$$= AEPL(X) - \Delta AV - 4EPTP$$
$$= (EPTP/180) \cdot (X - X_o) +$$
$$Y_o - (\Delta AV + 4EPTP)$$

$$L1 = VSPL(X) + EPTP \quad \text{Eq. 77:}$$
$$= (SPTP/180) \cdot X + EPTP$$

$$L2 = VEPL4(X) \quad \text{Eq. 78:}$$
$$= AEPL(X) - \Delta AV - 3\,EPTP$$
$$= (EPTP/180) \cdot (X - Y_o) +$$
$$Y_o - (\Delta AV + 3EPTP)$$

$$L1 = VSPL(X) \quad \text{Eq. 79:}$$
$$= (SPTP/180) \cdot X$$

$$L2 = VEPL4(X) \quad \text{Eq. 80:}$$
$$= (EPTP/180) \cdot (X - X_o) +$$
$$Y_o - (\Delta AV - 3EPTP)$$

$$L1 = VSPL(X) \quad \text{Eq. 81:}$$
$$= (SPTP/180) \cdot X$$

$$L2 = VEPL5(X) \quad \text{Eq. 82:}$$
$$= (EPTP/180) \cdot (X - X_o) +$$
$$Y_o - (\Delta AV + 4EPTP)$$

Moreover, if the apexes P1 to P4 have X and Y coordinates of $X_1$ to $X_4$ and $Y_1$ to $Y_4$, Equations 75 to 82 can be reformed into the following more general Equations 83 to 90.

$$X_1 = \{180/(SPTP-EPTP)\} \cdot (Y_o - \Delta AV - 5EPTP) \quad \text{Eq. 83:}$$

$$Y_1 = (SPTP/180) \cdot X_1 + EPTP \quad \text{Eq. 84:}$$

$$X_2 = \{180/(SPTP-EPTP)\} \cdot (Y_o - \Delta AV - 4EPTP) \quad \text{Eq. 85:}$$

$$Y_2 = (SPTP/180) \cdot X_2 + EPTP \quad \text{Eq. 86:}$$

$$X_3 = \{180/(SPTP-EPTP)\} \cdot (Y_o - \Delta AV - 3EPTP) \quad \text{Eq. 87:}$$

$$Y_3 = (SPTP/180) \cdot X_3 \quad \text{Eq. 88:}$$

$$X_4 = \{180/(SPTP-EPTP)\} \cdot (Y_o - \Delta AV - 4EPTP) \quad \text{Eq. 89:}$$

$$Y_4 = (SPTP/180) \cdot X_4 \quad \text{Eq. 90:}$$

Here: SPTP=57.8 μm; $Y_o$=0 degrees; and $\Delta AV$=3.22 μm. Thus, $X_1$=−463.3 degrees; $Y_1$=−129.6 μm; $X_2$=−373.7 degrees; $Y_2$=−100.8 μm; $X_3$=−284.0 degrees; $Y_3$=−91.2 μm; $X_4$=−373.7 degrees; and $Y_4$=−120.0 μm.

Figure 13:
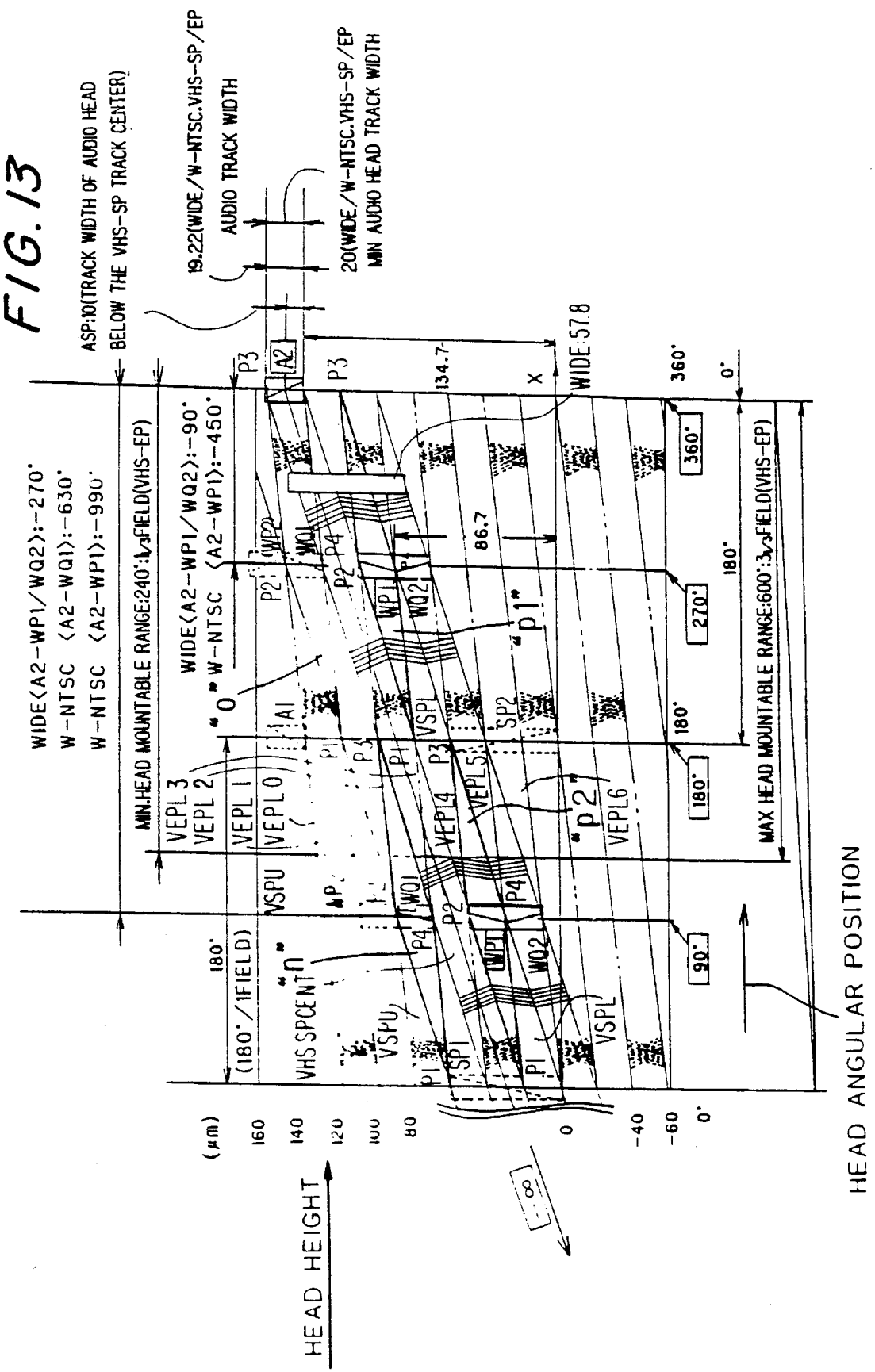
FIG. 13 is a diagram for explaining the head positioning in the extended play wide mode in the fourth embodiment.

Next, the positions for mounting the video heads WP1 and WP2 and the video heads WQ1 and WQ2 will be examined with reference to FIG. 13 in case the recording time difference between the heads SP1 and A2 has two fields. In this case, like the case of the zero field, the head WQ1 can be mounted in a region "n", as indicated by thick lines in FIG. 13. Here, the head WP1 can not be mounted in a region "o", because it precedes the head A1. On the other hand, the head WP1 can be mounted in regions "p1" and "p2".

The individual apexes P1 to P4 of the region "o" may be determined by deciding the intersections of two straight lines L1 and L2. That is: the straight line for determining the apex P1 is expressed by the following Equations 91 and 92; the straight line for determining the apex P2 is expressed by the following Equations 93 and 94; the straight line for determining the apex P3 is expressed by the following Equations 95 and 96 and the straight line for determining the apex P4 is expressed by the following Equations 97 and 98.

$$L1 = VSPU(X) \quad \text{Eq. 91:}$$
$$= (SPTP/180) \cdot X + SPTP$$

$$L2 = VEPL1(X) \quad \text{Eq. 92:}$$
$$= AEPL(X) - \Delta AV$$

$$L1 = VSPU(X) \quad \text{Eq. 93:}$$
$$= (SPTP/180) \cdot X + SPTP$$

$$L2 = VEPL0(X) \quad \text{Eq. 94:}$$
$$= AEPL(X) - \Delta AV - EPTP$$

$$L1 = VSPU(X) - EPTP \quad \text{Eq. 95:}$$
$$= (SPTP/180) \cdot X + SPTP - EPTP$$

$$L2 = VEPL0(X) \quad \text{Eq. 96:}$$
$$= AEPL(X) - \Delta AV - EPTP$$

$$L1 = VSPU(X) - EPTP \quad \text{Eq. 97:}$$
$$= (SPTP/180) \cdot X + SPTP - EPTP$$

$$L2 = VEPL1(X) \quad \text{Eq. 98:}$$
$$= AEPL(X) - \Delta AV$$

Moreover, if the apexes P1 to P4 have X and Y coordinates of $X_1$ to $X_4$ and $Y_1$ to $Y_4$, Equations 91 to 98 can be reformed into the following more general Equations 99 to 106.

$$X_1 = \{180/(SPTP-EPTP)\} \cdot (Y_o - \Delta AV - SPTP - 2EPTP) \quad \text{Eq. 99:}$$

$$Y_1 = (SPTP/180) \cdot X_1 + SPTP \quad \text{Eq. 100:}$$

$$X_2 = \{180/(SPTP-EPTP)\} \cdot (Y_o - \Delta AV - SPTP - EPTP) \quad \text{Eq. 101:}$$

$$Y_2 = (SPTP/180) \cdot X_2 + SPTP \quad \text{Eq. 102:}$$

$$X_3 = \{180/(SPTP-EPTP)\} \cdot (Y_o - \Delta AV - SPTP) \quad \text{Eq. 103:}$$

$$Y_3 = (SPTP/180) \cdot X_3 + SPTP - EPTP \quad \text{Eq. 104:}$$

$$X_4 = \{180/(SPTP-EPTP)\} \cdot (Y_o - \Delta AV - SPTP - EPTP) \quad \text{Eq. 105:}$$

$$Y_4 = (SPTP/180) \cdot X_4 + SPTP - EPTP \quad \text{Eq. 106:}$$

Here: SPTP=57.8 μm; $Y_o$=134.7 degrees; and $\Delta AV$=0 μm. Thus, $X_1$=179.2 degrees; $Y_1$=115.4 μm; $X_2$=268.9 degrees; $Y_2$=144.1 μm; $X_3$=358.5 degrees; $Y_3$=153.7 μm; $X_4$=268.9 degrees; and $Y_4$=124.9 μm.

The individual apexes P1 to P4 of the region "p1" may be determined by deciding the intersections of two straight lines L1 and L2. That is: the straight line for determining the apex P1 is expressed by the following Equations 107 and 108; the straight line for determining the apex P2 is expressed by the following Equations 109 and 110; the straight line for determining the apex P3 is expressed by the following Equations 111 and 112; and the straight line for determining the apex P4 is expressed by the following Equations 113 and 114.

$$L1 = VSPL(X) + EPTP \quad \text{Eq. 107:}$$
$$= (SPTP/180) \cdot X + EPTP$$

| | | | Eq. 108: |
|---|---|---|---|
| $L2$ | $=$ | $VEPL3(X)$ | |
| | $=$ | $AEPL(X) - \Delta AV - 2EPTP$ | |
| $L1$ | $=$ | $VSPL(X) + EPTP$ | Eq. 109: |
| | $=$ | $(SPTP/180) \cdot X + EPTP$ | |
| $L2$ | $=$ | $VEPL2(X)$ | Eq. 110: |
| | $=$ | $AEPL(X) - \Delta AV - EPTP$ | |
| $L1$ | $=$ | $VSPL(X)$ | Eq. 111: |
| | $=$ | $(SPTP/180) \cdot X$ | |
| $L2$ | $=$ | $VEPL2(X)$ | Eq. 112: |
| | $=$ | $AEPL(X) - \Delta AV - EPTP$ | |
| $L1$ | $=$ | $VSPL(X)$ | Eq. 113: |
| | $=$ | $(SPTP/180) \cdot X$ | |
| $L2$ | $=$ | $VEPL3(X)$ | Eq. 114: |
| | $=$ | $AEPL(X) - \Delta AV - 2EPTP$ | |

Moreover, if the apexes P1 to P4 have X and Y coordinates of $X_1$ to $X_4$ and $Y_1$ to $Y_4$, Equations 107 to 114 can be reformed into the following more general Equations 115 to 122.

$$X_1 = \{180/(SPTP-EPTP)\} \cdot (Y_o - \Delta AV - 5EPTP) \quad \text{Eq. 115:}$$

$$Y_1 = \{SPTP/(SPTP-EPTP)\} \cdot (Y_o - \Delta AV - 5EPTP) + EPTP \quad \text{Eq. 116:}$$

$$X_2 = \{180/(SPTP-EPTP)\} \cdot (Y_o - \Delta AV - 4EPTP) \quad \text{Eq. 117:}$$

$$Y_2 = \{SPTP/(SPTP-EPTP)\} \cdot (Y_o - \Delta AV - 4EPTP) + EPTP \quad \text{Eq. 118:}$$

$$X_3 = \{180/(SPTP-EPTP)\} \cdot (Y_o - \Delta AV - 3EPTP) \quad \text{Eq. 119:}$$

$$Y_3 = \{SPTP/(SPTP-EPTP)\} \cdot (Y_o - \Delta AV - 3EPTP) \quad \text{Eq. 120:}$$

$$X_4 = \{180/(SPTP-EPTP)\} \cdot (Y_o - \Delta AV - 4EPTP) \quad \text{Eq. 121:}$$

$$Y_4 = \{SPTP/(SPTP-EPTP)\} \cdot (Y_o - \Delta AV - 4EPTP) \quad \text{Eq. 122:}$$

Here: SPTP=57.8 μm; $Y_o$=134.7 degrees; and $\Delta AV$=0 μm. Thus, $X_1$=179.9 degrees; $Y_1$=77.0 μm; $X_2$=269.5 degrees; $Y_2$=105.8 μm; $X_3$=359.2 degrees; $Y_3$=115.4 μm; $X_4$=269.5 degrees; and $Y_4$=86.6 μm.

The individual apexes P1 to P4 of the region "n" may be determined by deciding the intersections of two straight lines L1 and L2. That is: the straight line for determining the apex P1 is expressed by the following Equations 123 and 124; the straight line for determining the apex P2 is expressed by the following Equations 125 and 126; the straight line for determining the apex P3 is expressed by the following Equations 127 and 128; and the straight line for determining the apex P4 is expressed by the following Equations 129 and 130.

| | | | Eq. 123: |
|---|---|---|---|
| $L1$ | $=$ | $VSPU(X)$ | |
| | $=$ | $(SPTP/180) \cdot X + SPTP$ | |
| $L2$ | $=$ | $VEPL3(X)$ | Eq. 124: |
| | $=$ | $AEPL(X) - \Delta AV - 2EPTP$ | |
| $L1$ | $=$ | $VSPU(X)$ | Eq. 125: |
| | $=$ | $(SPTP/180) \cdot X + SPTP$ | |
| $L2$ | $=$ | $VEPL2(X)$ | Eq. 126: |
| | $=$ | $AEPL(X) - \Delta AV - EPTP$ | |
| $L1$ | $=$ | $VSPU(X) - EPTP$ | Eq. 127: |
| | $=$ | $(SPTP/180) \cdot X + SPTP - EPTP$ | |
| $L2$ | $=$ | $VEPL2(X)$ | Eq. 128: |
| | $=$ | $AEPL(X) - \Delta AV - EPTP$ | |
| $L1$ | $=$ | $VSPU(X) - EPTP$ | Eq. 129: |
| | $=$ | $(SPTP/180) \cdot X + SPTP - EPTP$ | |
| $L2$ | $=$ | $VEPL3(X)$ | Eq. 130: |
| | $=$ | $AEPL(X) - \Delta AV - 2EPTP$ | |

Moreover, if the apexes P1 to P4 have X and Y coordinates of $X_1$ to $X_4$ and $Y_1$ to $Y_4$, Equations 123 to 130 can be reformed into the following more general Equations 131 to 138.

$$X_1 = \{180/(SPTP-EPTP)\} \cdot (Y_o - \Delta AV - 4EPTP) \quad \text{Eq. 131:}$$

$$Y_1 = \{SPTP/(SPTP-EPTP)\} \cdot (Y_o - \Delta AV - 4EPTP) + SPTP \quad \text{Eq. 132:}$$

$$X_2 = \{180/(SPTP-EPTP)\} \cdot (Y_o - \Delta AV - SPTP - 3EPTP) \quad \text{Eq. 133:}$$

$$Y_2 = \{SPTP/(SPTP-EPTP)\} \cdot (Y_o - \Delta AV - 3EPTP) + SPTP \quad \text{Eq. 134:}$$

$$X_3 = \{180/(SPTP-EPTP)\} \cdot (Y_o - \Delta AV - SPTP - 2EPTP) \quad \text{Eq. 135:}$$

$$Y_3 = \{SPTP/(SPTP-EPTP)\} \cdot (Y_o - \Delta AV - SPTP) - 2EPTP + SPTP - EPTP \quad \text{Eq. 136:}$$

$$X_4 = \{180/(SPTP-EPTP)\} \cdot (Y_o - \Delta AV - SPTP - 3EPTP) \quad \text{Eq. 137:}$$

$$Y_4 = \{SPTP/(SPTP-EPTP)\} \cdot (Y_o - \Delta AV - SPTP) - 3EPTP + SPTP - EPTP \quad \text{Eq. 138:}$$

Here: SPTP=57.8 μm; $Y_o$=134.7 degrees; and $\Delta AV$=0 μm. Thus, $X_1$=−0.1 degrees; $Y_1$=57.8 μm; $X_2$=89.5 degrees; $Y_2$=86.6 μm; $X_3$=179.2 degrees; $Y_3$=96.1 μm; $X_4$=89.5 degrees; and $Y_4$=67.3 μm.

The individual apexes P1 to P4 of the region "p2" may be determined by deciding the intersections of two straight lines L1 and L2. That is: the straight line for determining the apex P1 is expressed by the following Equations 139 and 140; the straight line for determining the apex P2 is expressed by the following Equations 141 and 142; the straight line for determining the apex P3 is expressed by the following Equations 143 and 144; and the straight line for determining the apex P4 is expressed by the following Equations 145 and 146.

| | | | Eq. 139: |
|---|---|---|---|
| $L1$ | $=$ | $VSPL(X) + EPTP$ | |
| | $=$ | $(SPTP/180) \cdot X + EPTP$ | |
| $L2$ | $=$ | $VEPL5(X)$ | Eq. 140: |
| | $=$ | $AEPL(X) - \Delta AV - 4EPTP$ | |
| $L1$ | $=$ | $VSPL(X) + EPTP$ | Eq. 141: |
| | $=$ | $(SPTP/180) \cdot X + EPTP$ | |
| $L2$ | $=$ | $VEPL4(X)$ | Eq. 142: |
| | $=$ | $AEPL(X) - \Delta AV - 3EPTP$ | |
| $L1$ | $=$ | $VSPL(X)$ | Eq. 143: |
| | $=$ | $(SPTP/180) \cdot X$ | |

| L2 | = | VEPL4(X) | Eq. 144: |
|---|---|---|---|
|  | = | AEPL − ΔAV − 3EPTP |  |
| L1 | = | VSPL(X) | Eq. 145: |
|  | = | (SPTP/180) · X |  |
| L1 | = | VEPL5(X) | Eq. 146: |
|  | = | AEPL(X) − ΔAV − 4EPTP |  |

Moreover, if the apexes P1 to P4 have X and Y coordinates of $X_1$ to $X_4$ and $Y_1$ to $Y_4$, Equations 139 to 146 can be reformed into the following more general Equations 147 to 154.

$X_1 = \{180(SPTP-EPTP)\} \cdot (Y_o - \Delta AV - 7EPTP)$  Eq. 147:

$Y_1 = SPTP/(SPTP-EPTP) \cdot X_1 + EPTP$  Eq. 148:

$X_2 = \{180/(SPTP-EPTP)\} \cdot (Y_o - \Delta AV - 6EPTP)$  Eq. 149:

$Y_2 = SPTP/(SPTP-EPTP) \cdot X_2 + EPTP$  Eq. 150:

$X_3 = \{180/(SPTP-EPTP)\} \cdot (Y_o - \Delta AV - 5EPTP)$  Eq. 151:

$Y_3 = SPTP/(SPTP-EPTP) \cdot X_3$  Eq. 152:

$X_4 = \{180/(SPTP-EPTP)\} \cdot (Y_o - \Delta AV - 6EPTP)$  Eq. 153:

$Y_4 = SPTP/(SPTP-EPTP) \cdot X_4$  Eq. 154:

Here: SPTP=57.8 μm; $Y_o$=134.7 degrees; and ΔAV=0 μm. Thus, $X_1$=0.5 degrees; $Y_1$=19.4 μm; $X_2$=90.0 degrees; $Y_2$=48.2 μm; $X_3$=179.6 degrees; $Y_3$=57.7 μm; $X_4$=90.1 degrees; and $Y_4$=29.0 μm.

Figure 14:
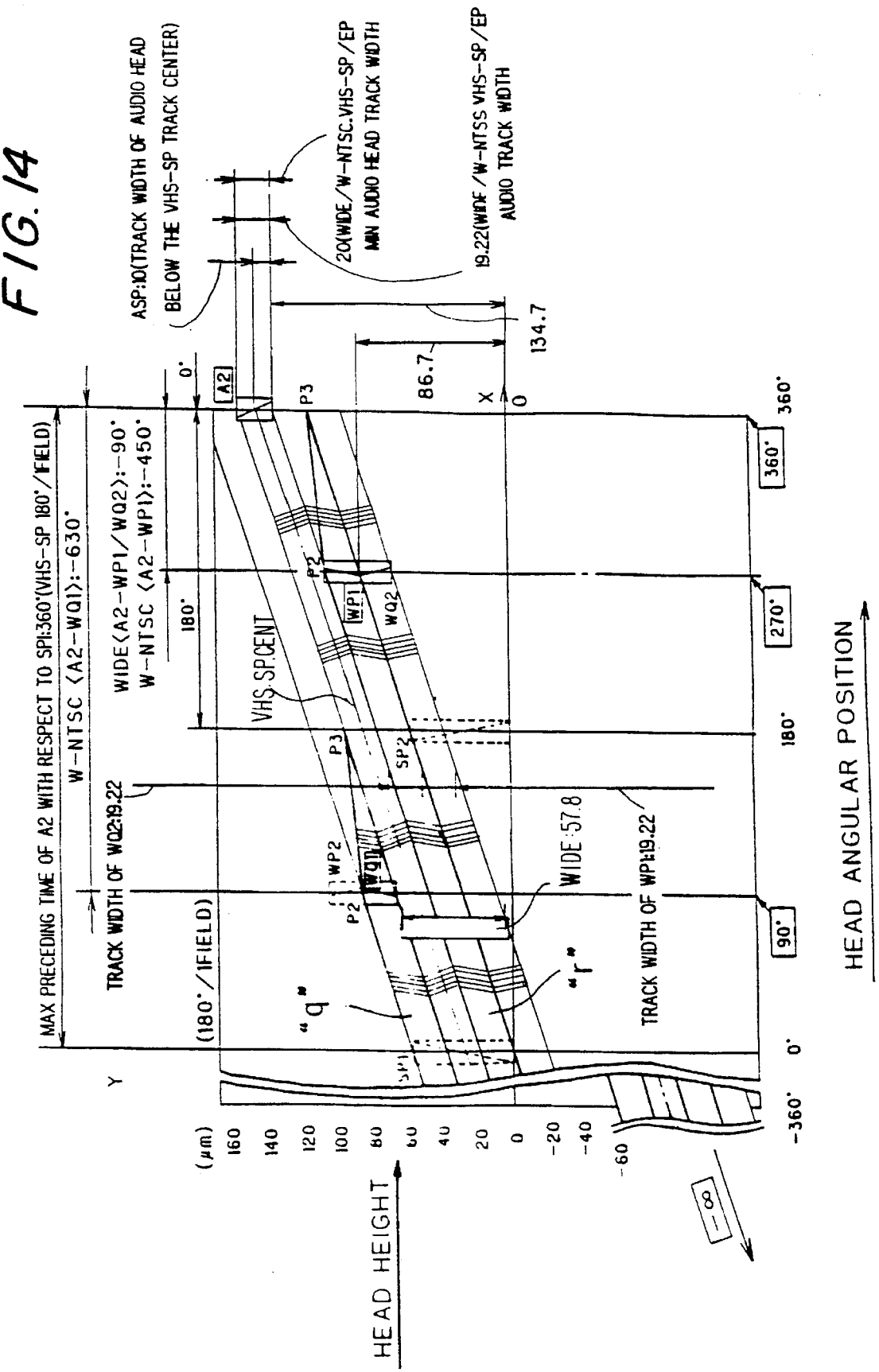
FIG. 14 is a diagram for explaining the head positioning of FIGS. 12 and 13 together.

Now, the aforementioned cases of the zero field and the two fields are integrated into FIG. 14. After all, the head WP1 can be mounted in a region "r", as indicated by thick lines in FIG. 14, whereas the head WQ1 can be mounted in a region "q".

Moreover, the audio heads A1 and A2 of the VHS system can be commonly used for the extended play wide mode by mounting the head WP2 at the same height as that of the head WP1 and at a spacing of 180 degrees and the head WQ1 at the same height as that of the head WQ2 and at a spacing of 180 degrees.

Figure 15A:
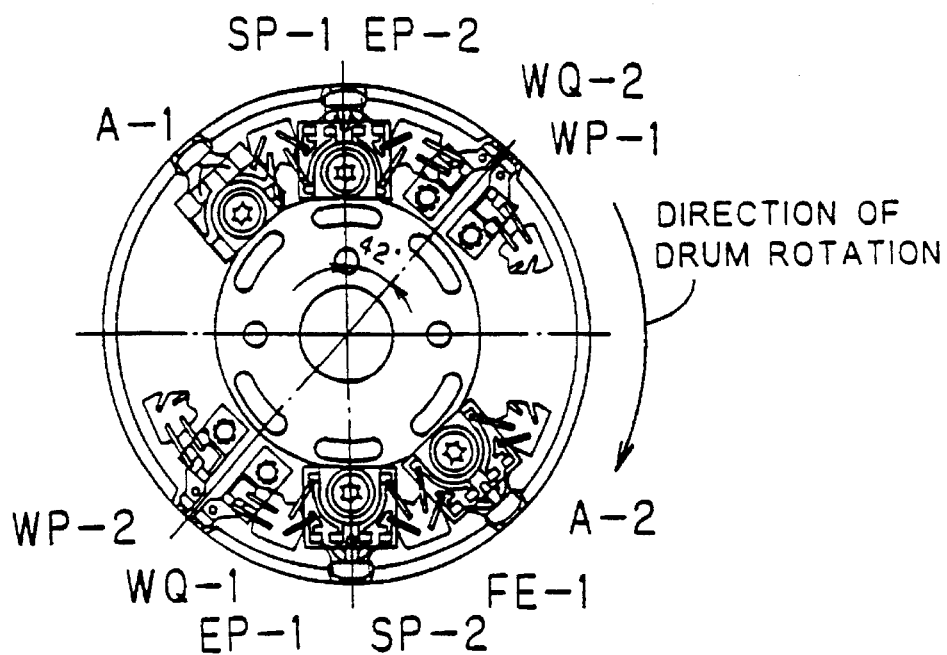
FIGS. 15(A) and 15(B) are top plan views for explaining a head arrangement over a rotary drum in a fourth embodiment.
Figure 15B:
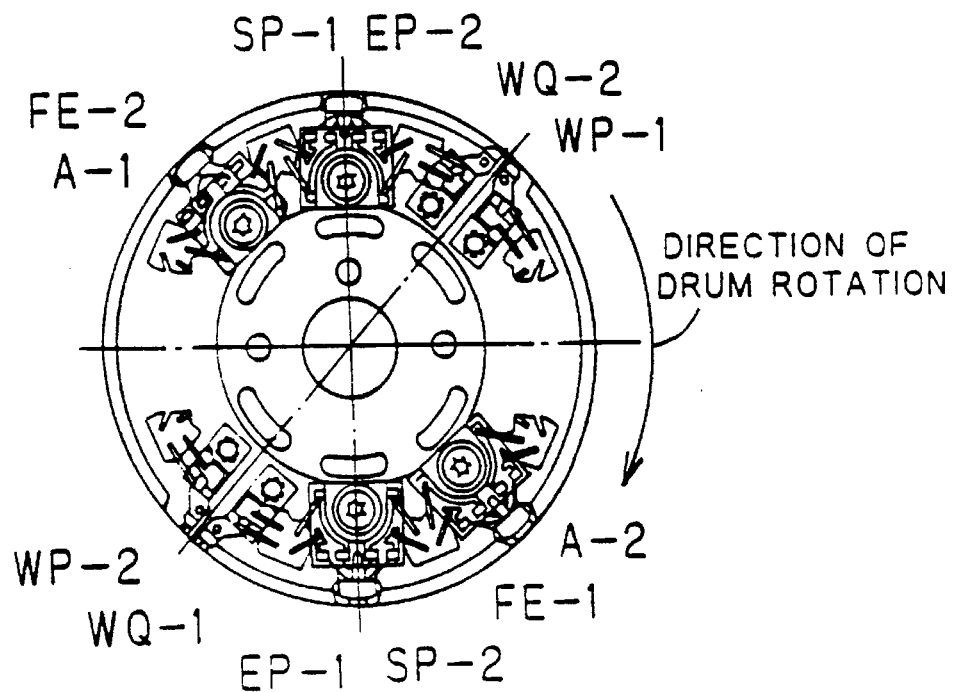
Figure 16:
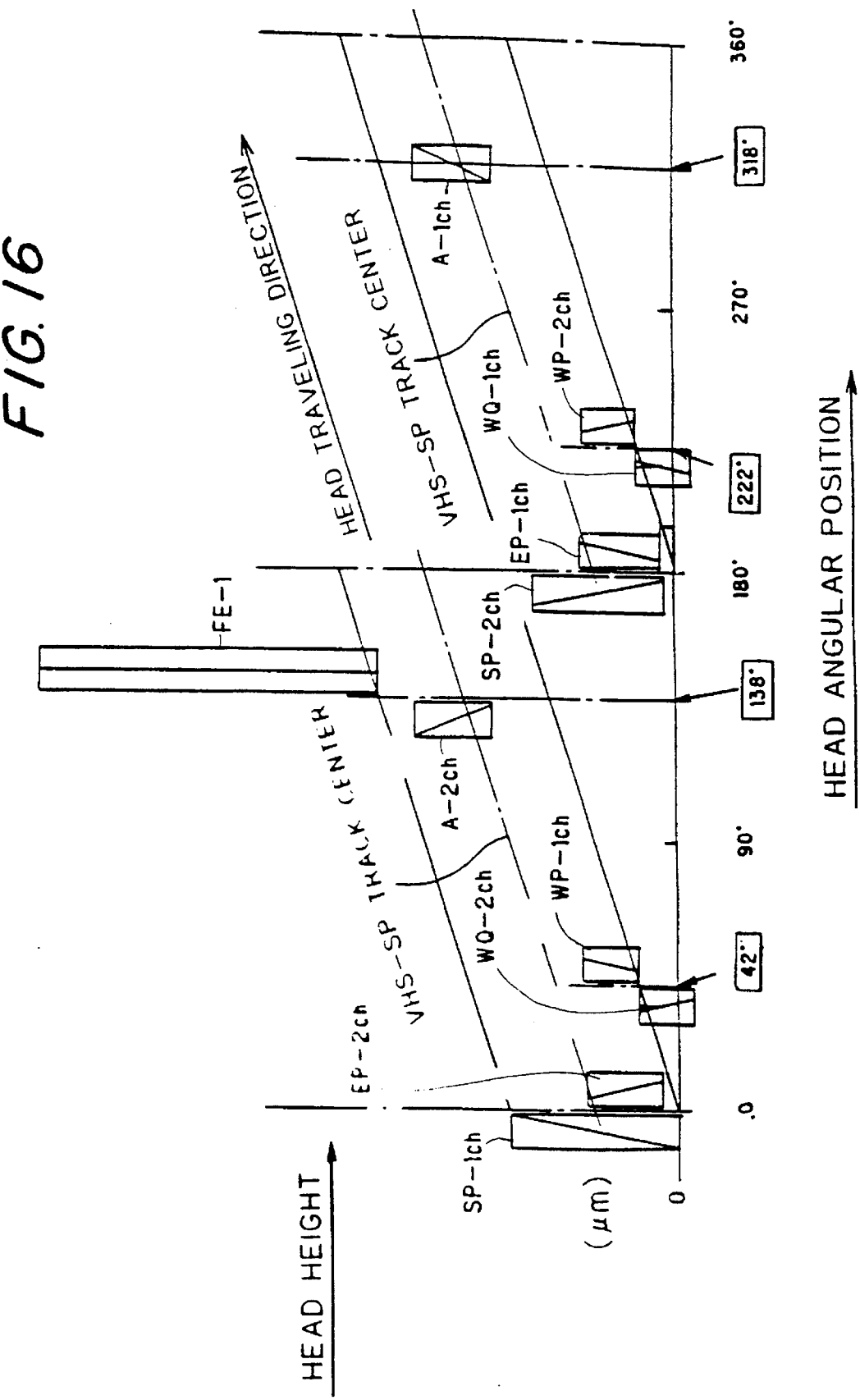
FIG. 16 is a conceptual diagram corresponding to FIG. 15(A) for explaining the angular position and vertical position in which the heads are mounted.

Here will be specifically described the arrangement of the magnetic heads on the rotary drum in the fourth embodiment with reference to FIGS. 15 to 17. FIG. 15(A) shows an arrangement, in which a flying erasing magnetic head FE1 for the VHS system is arranged adjacent to the magnetic head A2, and FIG. 15(B) shows an arrangement, in which a flying erasing magnetic head FE2 is arranged adjacent to the magnetic head A1. Moreover, the positions of mounting angles and heights of FIGS. 15(A) and 15(B) are illustrated in FIGS. 16 and 17. In FIGS. 16 and 17, the flying erasing magnetic head FE1 for the VHS system and the flying erasing magnetic head FE2 for the wide play mode are given a head width of 116 μm, which corresponds to the two fields. Incidentally, the flying erase may be carried out in the wide mode by using the VHS magnetic head FE1 shown in FIGS. 15(A) and 16.

In this case, however, the track at the field gap is different from that of the VHS system so that it cannot be erased from the track formed by the magnetic head WQ2 of FIG. 16. As shown in FIG. 17, therefore, the flying erasing magnetic head FE2 for the wide mode is arranged in the gap of the field in the wide mode.

Incidentally, in the first to fourth embodiments thus far described, one pair of the video heads WP1 and WP2 or the video heads WQ1 and WQ2 may have its azimuth angle set to ±6 degrees whereas the other pair may have its azimuth angle set to ±15 degrees, so that said one pair may be commonly used with the magnetic heads for the extended play mode of the VHS system.

Incidentally, the positions for mounting heads to be used commonly for the wide mode and the extended play wide mode are determined by the calculations assuming that the field frequency in the wide mode to 60 Hz. However, these head mounting positions take, with more or less differences, the values approximate to the head mounting positions which can be used commonly in case of field frequency of 59.94 Hz (for example, two EDTV signals are recorded as the high definition video signals, or the NTSC signals are individually recorded by the magnetic heads WP and WQ in the two-program fashion) for a kind of the wide mode and in case of the extended play wide mode.

In the foregoing first to fourth embodiments, the video heads WQ2 and WP1 and the video heads WP2 and WQ1 are mounted adjacent to each other so as to spare their mounting spaces. It is, however, quite natural that the head WQ2 may be mounted backward of the head WP1 in the drum rotating direction whereas the head WQ1 may be mounted backward of the head WP2 in the drum rotating direction.

As has been described hereinbefore, according to the structure of the present invention, it is possible to provide a magnetic recording/reproducing apparatus which can use the first and second common audio heads for the VHS standard play mode and the wide mode so that it can be used commonly in the VHS system of the prior art and in the wide mode while limiting an increase in the number of magnetic heads.

Moreover, since the lower end edge locus of the third and fourth video heads, the lower end edge locus of the fifth and sixth video heads, and the upper end edge locus of the seventh and eighth video heads are aligned on the tape pattern, other effects obtainable are that the magnetic heads can be easily mounted on the rotary drum and that the cross talk between the video tacks can be suppressed.

Still moreover, since the lower end edge locus of the third and fourth video heads and the lower end edge locus of the fifth and sixth video heads are aligned on the tape patterns whereas the upper end edge locus of the third and fourth video heads and the upper end edge locus of the seventh and eighth video heads are also aligned on the tape patterns, still another effect obtainable is that the magnetic heads can be easily mounted on the rotary drum.

Furthermore, the first and second common audio heads are also used in the extended play wide mode. Thus, a further effect is to provide a magnetic recording/reproducing apparatus which can effect the VHS system of the prior art, the wide mode and the extended play wide mode commonly while limiting the increase in the number of the magnetic heads.

What is claimed is:

1. A magnetic recording/reproducing apparatus comprising:

first and second audio heads having different azimuth angles of ±30 degrees each other, and being arranged on a rotary drum at opposed angular positions and at same vertical positions each other;

first and second video heads having different azimuth angles of ±6 degrees each other arranged on said rotary drum at opposed angular positions and at same vertical positions each other, said first and second video heads being preceded respectively by said first and second audio heads;

third and fourth video heads arranged on said rotary drum at opposed angular positions and at same vertical positions each other, said third and fourth video heads being preceded respectively by said first and second audio heads, said third and fourth video heads having azimuth angles different from those of said first and second audio heads and said first and second video heads; and fifth and sixth video heads arranged on said rotary drum at opposed angular positions and at same vertical positions each other, said fifth and sixth video heads being preceded respectively by said first and second audio heads, said fifth and sixth video heads having azimuth angles different from those of said first and second audio heads and said first and second video heads, said fifth and sixth video heads being arranged below and close to said third and fourth video heads;

whereas upon recording in a standard-play mode, preceding audio tracks are formed in a deeper portion of a magnetic layer of a magnetic tape by said first and second audio heads, and succeeding video tracks are then formed in a surface portion of said magnetic layer over said deeper portion of said magnetic layer by said first and second video heads; and whereas upon recording in a modified play mode in which a tape running velocity and a rotary drum rotating velocity produce substantially a same track pitch and a track angle as those of the standard-play mode the preceding audio tracks having a width of about one third of the track pitch of said succeeding video tracks are formed by said first and second audio heads, and first and second video tracks having individual widths of about one third of the track pitch of said succeeding video tracks are formed by said third and fourth video heads and said fifth and sixth video heads, said first and second video tracks being formed parallel and side by side with said preceding audio tracks.

2. A magnetic recording/reproducing apparatus according to claim 1, wherein the lower end edge locus of said first and second video heads, the lower end edge locus of said third and fourth video heads and the upper end edge locus of said fifth and sixth video heads are aligned on the tape pattern.

3. A magnetic recording/reproducing apparatus according to claim 1, wherein said first and second audio heads operate commonly in at least two modes among the standard-play mode, the modified-play mode and an extended-play mode.

4. A magnetic recording/reproducing apparatus comprising:

first and second audio heads having different azimuth angles of ±30 degrees each other, and being arranged on a rotary drum at opposed angular positions and at same vertical positions each other;

first and second video heads having different azimuth angles of ±6 degrees each other arranged on said rotary drum at opposed angular positions and at same vertical positions each other, said first and second video heads being preceded respectively by said first and second audio heads;

third and fourth video heads arranged on said rotary drum at opposed angular positions and at same vertical positions each other, said third and fourth video heads being preceded respectively by said first and second audio heads, said third and fourth video heads having azimuth angles different from those of said first and second audio heads and said first and second video heads; and fifth and sixth video heads having azimuth angles different from those of said first and second audio heads and said first and second video heads, said fifth and sixth video heads being arranged on said rotary drum at opposed angular positions and at same vertical positions each other, said fifth and sixth video heads being preceded respectively by said first and second audio heads, said fifth and sixth video heads being arranged over and at a spacing of about one third of the track pitch of said succeeding video tracks from said third and fourth video heads;

whereas upon recording in a standard-play mode, preceding audio tracks are formed in a deeper portion of a magnetic layer of a magnetic tape by said first and second audio heads, and succeeding video tracks are then formed in a surface portion of said magnetic layer over said deeper portion of said magnetic layer by said first and second video heads; and whereas upon recording in a modified-play mode in which a tape running velocity and a rotary drum rotating velocity produce substantially a same track pitch and a track angle as those of the standard-play mode, the preceding audio tracks having a width of about one third of the track pitch of said succeeding video tracks are formed by said first and second audio heads, and first and second video tracks having individual widths of about one third of the track pitch of said succeeding video tracks are formed by said third and fourth video heads and said fifth and sixth video heads, said first and second video tracks being formed parallel and side by side with said preceding audio tracks.

5. A magnetic recording/reproducing apparatus according to claim 4, wherein the lower end edge locus of said first and second video heads and the lower end edge locus of said third and fourth video heads are aligned on the tape pattern, and wherein the upper end edge locus of said first and second video heads and the upper end edge locus of said fifth and sixth video heads are aligned on the tape pattern.

6. A magnetic recording/reproducing apparatus according to claim 4, wherein said first and second audio heads operate commonly in at least two modes among the standard-play mode, the modified-play mode and an extended-play mode.

7. A magnetic recording/reproducing apparatus comprising:

first and second audio heads having different azimuth angles of ±30 degrees each other, and being arranged on a rotary drum at opposed angular positions and at same vertical positions each other;

first and second video heads having different azimuth angles of ±6 degrees each other arranged on said rotary drum at opposed angular positions and at same vertical positions each other, said first and second video heads being preceded respectively by said first and second audio heads;

third and fourth video heads arranged on said rotary drum at opposed angular positions and at same vertical positions each other, said third and fourth video heads being preceded respectively by said first and second audio heads, said third and fourth video heads having azimuth angles different from those of said first and second audio heads and said first and second video heads; and fifth and sixth video heads arranged on said rotary drum at opposed angular positions and at same vertical positions each other, said fifth and sixth video heads being preceded respectively by said first and second audio heads, said fifth and sixth video heads having azimuth angles different from those of said first and second audio heads and said first and second video heads, said fifth and sixth video heads being arranged below and close to said third and fourth video heads;

whereas upon recording in a standard-play mode, preceding audio tracks are formed in a deeper portion of a magnetic layer of a magnetic tape by said first and second audio heads, and succeeding video tracks are then formed in a surface portion of said magnetic layer over said deeper portion of said magnetic layer by said first and second video heads;

whereas upon recording in a modified-play mode in which a tape running velocity and a rotary drum rotating velocity produce substantially a same track pitch and a track angle as those of the standard-play mode, the audio tracks having a width of about one third of the track pitch of said succeeding video tracks are formed by said first and second audio heads, and first and second video tracks having individual widths of about one third of the track pitch of said succeeding video tracks are formed by said third and fourth video heads and said fifth and sixth video heads; and whereas upon recording in a modified extended-play mode, the audio tracks having a width of about one third of the track pitch of said succeeding video tracks are formed in the deeper portion of said magnetic layer by said first and second audio heads at the tape running velocity and at substantially the same rotary drum rotating velocity for establishing substantially the same track pitch and track angle as those of the extended-play mode, and third and fourth video tracks having widths of about one third of the track pitch of said succeeding video tracks are formed in the surface portion of said magnetic layer over said deeper portion of said magnetic layer by one of a first group of said third and fourth video heads and a second group of said fifth and sixth video heads.

8. A magnetic recording/reproducing apparatus comprising:

first and second audio heads having different azimuth angles of ±30 degrees each other, and being arranged on a rotary drum at opposed angular positions and at same vertical positions each other;

first and second video heads having different azimuth angles of ±6 degrees each other arranged on said rotary drum at opposed angular positions and at same vertical positions each other, said first and second video heads being preceded respectively by said first and second audio heads;

third and fourth video heads arranged on said rotary drum at opposed angular positions and at same vertical positions each other, said third and fourth video heads being preceded respectively by said first and second audio heads, said third and fourth video heads having azimuth angles different from those of said first and second audio heads and said first and second video heads; and fifth and sixth video heads having azimuth angles different from those of said first and second audio heads and said first and second video heads, said fifth and sixth video heads being arranged on said rotary drum at opposed angular positions and at same vertical positions each other, said fifth and sixth video heads being preceded respectively by said first and second audio heads, said fifth and sixth video heads being arranged over and at a spacing of about one third of the track from said third and fourth video heads;

whereas upon recording in a standard-play mode, preceding audio tracks are formed in a deeper portion of a magnetic layer of a magnetic tape by said first and second audio heads, and succeeding video tracks are then formed in a surface portion of said magnetic layer over said deeper portion of said magnetic layer by said first and second video heads;

whereas upon recording in a modified-play mode in which a tape running velocity and a rotary drum rotating velocity produce substantially a same track pitch and a track angle as those of the standard-play mode, the preceding audio tracks having a width of about one third of the track pitch of said succeeding video tracks are formed by said first and second audio heads, and first and second video tracks having individual widths of about one third of the track pitch of said succeeding video tracks are formed by said third and fourth video heads and said fifth and sixth video heads; and whereas upon recording in a modified extended-play mode, the audio tracks having a width of about one third of the track pitch of said succeeding video tracks are formed in the deeper portion of said magnetic layer by said first and second audio heads at the tape running velocity and at substantially the same rotary drum rotating velocity for establishing substantially the same track pitch and track angle as those of the extended-play mode, and third and fourth video tracks having widths of about one third of the track pitch of said succeeding video tracks are formed in the surface portion of said magnetic layer over said deeper portion of said magnetic layer by one of a first group of said third and fourth video heads and a second group of said fifth and sixth video heads.

* * * * *